(12) United States Patent
Muratani

(10) Patent No.: US 6,768,807 B1
(45) Date of Patent: Jul. 27, 2004

(54) DIGITAL WATERMARK EMBEDDING DEVICE, DIGITAL WATERMARK DETECTION DEVICE, DIGITAL INFORMATION DISTRIBUTION DEVICE, AND, STORAGE MEDIUM

(75) Inventor: Hirofumi Muratani, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/533,767

(22) Filed: Mar. 23, 2000

(30) Foreign Application Priority Data

Mar. 24, 1999 (JP) .......................................... 11-080268

(51) Int. Cl.[7] .............................................. G06K 9/00
(52) U.S. Cl. ...................................... 382/100; 713/176
(58) Field of Search ................................ 382/100, 232, 382/240; 380/51, 54, 201, 210, 252, 287; 370/522, 523, 524, 525, 526, 527, 528, 529; 713/176, 179; 386/94; 725/9, 20, 22; 283/902; 399/366; 705/57, 58; 358/3.28; 381/73.1

(56) References Cited

U.S. PATENT DOCUMENTS

| 5,745,604 | A |   | 4/1998 | Rhoads |
| 5,848,155 | A | * | 12/1998 | Cox ........................... 382/191 |
| 6,026,193 | A | * | 2/2000 | Rhoads ....................... 382/232 |
| 6,181,802 | B1 | * | 1/2001 | Todd .......................... 382/100 |
| 6,240,121 | B1 | * | 5/2001 | Senoh ......................... 375/130 |
| 6,614,914 | B1 | * | 9/2003 | Rhoads et al. ............... 382/100 |

FOREIGN PATENT DOCUMENTS

| EP | 1 006 710 | 6/2000 |
| JP | 11-032200 | 2/1999 |

OTHER PUBLICATIONS

Cox., I. et al., "Secure Spread Spectrum Watermarking for Multimedia", NEC Research Institute, Technical Report 95–10, pp. 1–33, Oct. 1995.

Ohnishi, J. et al., "A Watermarking Scheme to Image Data by PN Sequence", SCIS'97–26B, pp. 1–8, Jan. 1997.

Jean–Paul Linnartz et al., "Modelling the false alarm and missed detection rate for electronic watermarks," Philips Research Laboratories, Proceedings, Information Hiding '98, pp. 329–431, Apr. 14–17, 1998; Portland, Oregon.

Jean–Paul M.G. Linnartz et al., "A reliability model for the detection of electronic watermarks in digital images," Benelux Symposium on Communication Theory, pp. 202–209, Oct. 1997.

Geert Depovere et al., "Improved Watermark Detection Reliability Using Filtering Before Correlation," IEEE, pp. 430–434, 1998.

Cox et al., "A Secure, Robust Watermark for Multimedia," Workshop on Information Hiding (May 1996), pp. 1–16.

* cited by examiner

*Primary Examiner*—Jayanti K. Patel
*Assistant Examiner*—Abolfazl Tabatabai
(74) *Attorney, Agent, or Firm*—Finnegan, Henderson, Farabow, Garrett, Dunner, L.L.P.

(57) ABSTRACT

A digital watermark embedding device by which digital data is assumed to be an embedding target and the digital watermark is embedded, has spread spectrum section to set the embedding target to be a unit spreading block which performs the spread spectrum of the spreading block in which the embedding target includes more than two adjacent basic unit of each bases which constructs the plurality of basic units, multiplies the same pseudo-random number signal is multiplied to the embedding target more than two the basic units in the unit spreading block, and perform the spread spectrum of the embedding target, and watermark embedding section to embed the digital watermark in the embedding target to which the spread spectrum is performed by the spread spectrum section.

17 Claims, 13 Drawing Sheets

SPACIAL DOMAIN INFORMATION

FREQUENCY DOMAIN INFORMATION

FREQUENCY DOMAIN INFORMATION

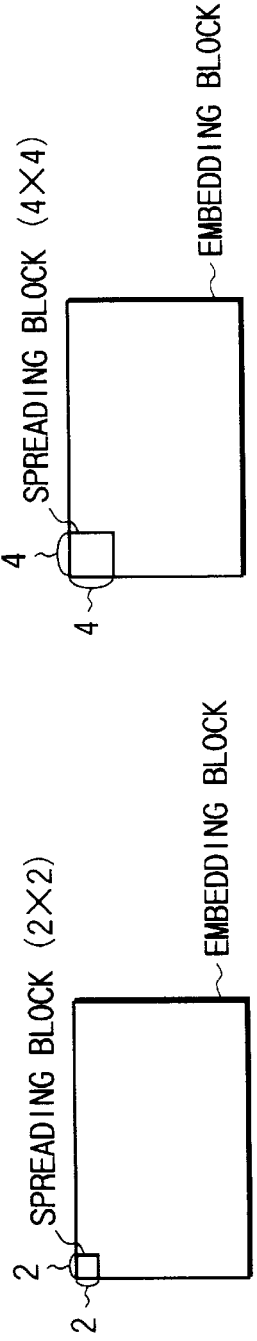

CASE OF AVERAGING EVERY AVERAGING
BLOCK AND SHIFTING PIXEL VALUE

DIGITAL WATERMARK EMBEDDING DEVICE, DIGITAL WATERMARK DETECTION DEVICE, DIGITAL INFORMATION DISTRIBUTION DEVICE, AND, STORAGE MEDIUM

CROSS-REFERENCE TO RELATED APPLICATIONS

This application is based upon and claims the benefit of priority from the prior Japanese Patent Application No. 11-080268, filed Mar. 24, 1999, the entire contents of which are incorporated herein by reference.

BACKGROUND OF THE INVENTION

The present invention relates to a digital watermark embedding device, a digital watermark detection device, a digital information distribution device, and a storage medium.

Recently, a technology to which information, which is called as watermark information, is embedded is used for the digital author data of a moving picture, a static picture, and the voice and music, etc. In this technology, copyright protection and usage control of digital data (prevention of illegal use etc.) is performed by embedding watermark information to become a hard state to perceive visually or audibly, and thereafter detecting watermark information in the data if necessary. Identification information of the author of the user of the digital data, right information of copyrighter, a usage condition of the data, secret information, usage control information, and copy control information, etc. which are required to use them are used, for example, as watermark information.

The digital watermarking method applied, for example, image data includes a method to embed digital watermark information in a spatial (pixel value) domain and a method to embed it in a frequency domain. First, watermark information is embedded in the specimen values in the method of embedding watermark information in the spatial domain. Though, generally, the processing of embedding and detection is light in this method, it is easy to loose watermark information by the noise added by the third party.

On the other hand, the orthogonal transformation is performed to the specimen values, and watermark information is embedded to the data converted into the frequency domain by the conversion in the method of embedding watermark information in the frequency domain. Thereafter, an inverse-orthogonal transformation is performed, and the specimen value is reproduced. In this method, since watermark information is not embedded directly in the specimen value, it is comparatively difficult to remove information by addition of the noise. However, since it is necessary to perform an orthogonal transformation and an inverse-orthogonal transformation, the processing of embedding and detection is heavy.

There is a method to apply the idea of spread spectrum to the method to embed watermark information in the frequency component. The spread spectrum is the communication method which widely distributes information in a large band enough compared with a necessary band for the signal to communicate and transmits it. The tolerance to the noise on the transmission line is excellent in this method.

On the other hand, the method to use the spread spectrum which Prof. Matsui et al. of Defense Academy proposed is called direct sequence spread spectrum method. In this method, it is a spread spectrum according to multiplying the PN (pseudo-random noise) sequence to the pixel value. The orthogonal transformation is performed to the obtained image further, watermark information is embedded in the frequency domain, and an inverse-orthogonal transformation is performed again. And the same PN sequence is multiplied. The detection of watermark information is performed by using the direct sequence spread spectrum of the pixel value by the PN (pseudo-random noise) sequence. The orthogonal transformation is performed to the obtained image, and judges from the value of the frequency component in which watermark information is embedded.

Since watermark information is spreaded and embedded by multiplying the PN sequence from information converted into the frequency domain in the perturbation method, it is possible to embed and control so that the energy of the digital watermark is distributed to from low to intermediate frequency domain as described above. On the other hand, in the direct sequence spread spectrum method, after data manipulation is performed beforehand by the previous execution of the spreading processing so that the energy distribution of the digital watermark in the frequency domain becomes a Gaussian distribution, the orthogonal transform is performed and than watermark information is embedded. Therefore, in a case of the direct sequence spread spectrum method, the energy of the digital watermark embedded by the inverse spreading by the PN sequence after embedding is distributed to the high frequency domain. Therefore, watermark information is easily lost for the D-A-D conversion and the StirMark attack in the conventional direct sequence spread spectrum method compared with the perturbation method. The energy (intensity) of the digital watermark attenuates since the high frequency component is deleted even in DCT conversion in image compressions such as MPEG and JPEG.

Direct sequence spread spectrum method will be explained referring to FIG. 1A to FIG. 2 in more detail.

FIG. 1A to FIG. 1C are figures, which show an appearance to perform the spread spectrum in the direct sequence spread spectrum method, first.

FIG. 2 is a figure which shows an appearance to embed watermark information by the direct sequence spread spectrum method and performing an inverse-spectrum spreading.

First, FIG. 1A shows an appearance to multiply the PN sequence to the original picture image and convert (spread spectrum) into a random image. Information is in the pixel domain in this stage. FIG. 1B and FIG. 1C show a case that information of FIG. 1A is applied to information on the frequency domain. FIG. 1B and FIG. 1C are shown for convenience sake for the explanation, and conversion into the frequency domain is actually performed after the spread spectrum.

As shown in FIG. 1B, the direct sequence spread spectrum method temporarily converts into random information which extends to the high frequency domain pixel information which concentrates on the low frequency domain (especially, DC component) by performing the spread spectrum in the pixel domain. FIG. 1C is a figure which changes this to frequency-frequency component value distribution, and it is known to be converted into the Gaussian distribution after spreading. This distribution is according to the given PN sequence.

Though the processing of FIG. 1A shows the spread spectrum in FIG. 2, in the direct sequence spread spectrum method, in addition, orthogonal transformation is performed and watermark information is embedded. FIG. 2(d) shows a figure in which watermark information is embedded.

That is, the information embedding is performed by changing the data point in the original picture image data converted into information on the frequency domain and changing the frequency component value. In detection and the extraction of data, whether the watermark information is embedded is judged by whether the data point moved at this time exceeds the threshold. In the direct sequence spread spectrum method, watermark information is prevented from modifying, deleting, and leaking by the third party by assuming the embedded position of watermark information in the PN sequence and the frequency domain to be secret information.

Though embedded watermark information is on the frequency domain, and the information image data which is embedded on the frequency domain is returned to image data on the pixel domain by an inverse-orthogonal transformation and an inverse-spread spectrum (FIG. 2(d) to FIG. 2(f)). Here, watermark information embedded in the frequency domain exists on image data as a noise superimposed on the original picture image by the inverse-spreading. Watermark information as this noise is information (noise) to which the frequency is modulated by the PN sequence, and, in general, it becomes the frequency over a high frequency from low frequency (FIG. 2(f)). That is, the energy of watermark information is diffused and distributed to a wide frequency band contrary to the original picture image data, by an inverse-spread spectrum in the direct sequence spread spectrum method. This respect is a large difference point with the perturbation method.

The direct sequence spread spectrum method differs from the perturbation method for the spreading (make to the noise) of watermark information by this inverse-spread spectrum, and the energy of watermark information given in the frequency domain exists also in the high frequency domain. Therefore, if the high frequency component of those is lost, the energy of watermark information decreases for lost component. Therefore, the threshold is not exceeded even if the spread spectrum and the orthogonal transformation are performed to detect watermark information, it may be possible to detect watermark information. It is necessary to embed watermark information to prevent this by enough large intensity.

FIG. 3A to FIG. 3D are figures which show the data distribution in the frequency domain to explain the problem of the information embedding in the direct sequence spread spectrum method.

Watermark information is lost in the high frequency component deletion in the pixel domain as described above in the change of the frequency component value of extent which slightly exceeds the threshold as shown in FIG. 3A. Therefore, watermark information will disappear by the operation of irreversible compression/expansion by the third party in the state shown in FIG. 3A.

On the other hand, even if the high frequency component deletion in the pixel domain is performed when the frequency component value, which exceeds greatly the threshold as shown in FIG. 3B, is changed, watermark information is not lost. However, as described above, since watermark information given in the frequency domain becomes a noise when it is converted into the pixel domain, when watermark information is embedded with too high intensity (FIG. 3B), deterioration of the original picture image becomes large.

Thus, there is a problem that the corresponding information is lost easily if the energy given to watermark information is reduced, and the original data of the image etc. are deteriorated when the giving energy becomes large in the conventional direct sequence spread spectrum method.

On the other hand, in Jean-Paul M. G. Linnartz, A. A. C. Kalker, G. F. G. Depovere, R. A. Beuker, "A reliability model for the detection of electronic watermarks in digital images," Benelux Symposium on Communication Theory, 202–209, October 1997. "Modelling the false alarm and missed detection rate for electronic watermark" "Improved Watermark Detection Reliability Using Filtering Before Correlation" Geert Depovere Ton Kalker Jean-Linnartz and IEEE International Conference on Image Processing October 1998. And, Jean-Paul Linnartz Ton Kalker Geert Depovere and Second Workshop on Information Hiding 15–17 Apr. 1998, the technology which emphasizes the component on the high frequency domain as a preprocessing of the detection of watermark information is proposed. However, these technologies only emphasizes the high frequency component which exists, and can not correspond when information on the high frequency component is lost.

On the other hand, there is a disadvantage of taking time for the watermark information embedding though watermark information is not lost easily in the perturbation method. The reason why it is necessary to perform the orthogonal transformation of the original picture image data in the perturbation method.

BRIEF SUMMARY OF THE INVENTION

A first object of the present invention is to provide a digital watermark embedding device, a digital watermark detection device, a digital information distribution device, and a storage medium which can prevent the energy of digital watermark information embedded by the direct sequence spread spectrum method from being distributed to the high frequency region in the inverse-spread spectrum process, and can hardly disappear digital watermark information.

A second object of the present invention is to provide a digital watermark embedding device, a digital watermark detection device, a digital information distribution device, and a storage medium in which dispersion in the data distribution converted into the frequency domain by the spread spectrum and the orthogonal transformation can become small, and in addition, the watermark information embedding which does not disappear easily even by small embedding intensity can be performed, when embedding digital watermark information by the direct sequence spread spectrum method.

A third object of the present invention is to provide a digital watermark embedding device, a digital watermark detection device, a digital information distribution device, and a storage medium provide, in which a high-speed watermark embedding can be performed, when digital watermark information is embedded by the direct sequence spread spectrum method.

Hereafter, though the invention performed to solve the above-mentioned problem will be explained, the gist of the invention will described before this.

The first gist of the present invention performs spectrum spreading of embedding or detection target in a unit for spectrum spreading in which at least two basic units of data each of which constructs embedding or detection target, for example, a pixel in an image data etc. In a case of inverse spreading a target which is spreaded and is watermark embedded like this, since an inverse-spectrum spreading is performed in larger data block than a basic unit, the high frequency component corresponding to watermark information does not exist at the basic unit base which constructs embedding or the detection target, as a result, the watermark energy can be prevented being distributed to the high frequency domain.

The second gist of the present invention is to shift a value basic is shifted by an average value which is averaged in a block unit which is larger than a basic unit, and, is smaller than the target of embedding or detection. If data shift is performed according to such a limited part average, since dispersion (square-mean) becomes small in data distribution after shifting, and the watermark embedding which does not disappear easily by small embedding energy becomes possible. As a result, the amount of embedding information can be made large and deterioration in the field data can be reduced.

In the third gist of the present invention, the square-mean is obtained for the set consisting of the value basic which is embedding or detection target and the square-mean is set to a square-mean of the frequency component value in the frequency domain. The fact that this is possible is found by the inventor, and is shown by the following equation (6) and equation (7). In addition, if the square-mean of the frequency component value is known, a necessary and enough digital watermark embedding intensity can be calculated based on the value. A necessary and enough intensity here is extent in which the watermark does not disappear easily and deterioration in the field data can be prevented. Specific embedding intensity $\lambda$ is shown by the following equation (8), equation (9), and equation (10).

The first digital watermark embedding device by which digital data is assumed to be an embedding target and the digital watermark is embedded, according to the present invention is characterized by comprising: spread spectrum means to set said embedding target to be a unit spreading block which performs the spread spectrum of the spreading block in which said embedding target includes more than two adjacent basic unit of each bases which constructs the plurality of basic units, multiplies the same pseudo-random number signal is multiplied to said embedding target more than two said basic units in said unit spreading block, and perform the spread spectrum of said embedding target; and watermark embedding means to embed the digital watermark in the embedding target to which the spread spectrum is performed by said spread spectrum means. The energy of digital watermark information embedded by the direct sequence spread spectrum method can be prevented being distributed to the high frequency region in the inverse spread spectrum processing, in addition, digital watermark information can not be easily disappeared.

The second digital watermark embedding device by which digital data is assumed to be an embedding target and the digital watermark is embedded, according to the present invention is characterized by comprising: average value calculation means to set said embedding target to be a unit averaging block which calculates an average of the averaging block in which said embedding target includes more than two adjacent basic units of each base which constructs the plurality of basic units, and calculate an average of the plurality of basic units at every said averaging block; data shift means to shift basic value of each said plurality basic units which belong to said averaging block by calculating a difference of each averaging block with the average value of basic value of each said plurality basic units which belong to the averaging block and the corresponding averaging block; spread spectrum means to perform a spread spectrum of the embedding target to which the value is shifted by said data shift means; and watermark embedding means to embed a digital watermark in the embedding target to which the spread spectrum is performed by said spread spectrum means. When embedding digital watermark information by the direct sequence spread spectrum method, The dispersion in the data distribution converted into the frequency domain by the spread spectrum and the orthogonal transformation can become small and in addition, the watermark information embedding which does not disappear easily even by small embedding intensity can be performed.

The third digital watermark embedding device by which digital data is assumed to be an embedding target and the digital watermark is embedded, according to the present invention is characterized by comprising: average value calculation means to set said embedding target to be a unit averaging block which calculates an average of the averaging block in which said embedding target includes more than two adjacent basic units of each base which constructs the plurality of basic units, and calculate an average of the plurality of basic units at every said averaging block; data shift means to shift basic value of each said plurality basic units which belong to said averaging block by calculating a difference of each averaging block with the average value of basic value of each said plurality basic units which belong to the averaging block and the corresponding averaging block; spread spectrum means to set said embedding target to be a unit spreading block which performs the spread spectrum of the spreading block in which said embedding target includes more than two adjacent basic unit of each bases which constructs the plurality of basic units, multiplies the same pseudo-random number signal is multiplied to said embedding target more than two said basic units in said unit spreading block, and perform the spread spectrum of said embedding target; and watermark embedding means to embed the digital watermark in the embedding target to which the spread spectrum is performed by said spread spectrum means. The advantage which combines the first digital watermark embedding device and the second digital watermark embedding device can be achieved. Here, the spreading block is smaller data size than that of said averaging block, and is included in said averaging block. The third digital watermark embedding device can be easily achieved.

The fifth digital watermark embedding device by which digital data is assumed to be an embedding target and the digital watermark is embedded, according to the present invention is characterized by comprising: embedding intensity calculation means, when said embedding target is assumed to be sets of values of basic unit which constructs the embedding target, to assume a square-mean of the values of the basic unit as a square-mean of the frequency component value in the frequency domain after the spreading of said sets and to calculate the embedding intensity of the digital watermark based on the square-mean of said frequency component value; and watermark embedding means to embed the digital watermark in said embedding target by using said embedding intensity. A high-speed watermark embedding can be performed at digital watermark information embedding by the direct sequence spread spectrum method.

The sixth digital watermark embedding device according to the present invention is, in the first to fourth digital watermark embedding devices as mentioned above, embedding intensity calculation means, when said embedding target is assumed to be sets of values of basic unit which constructs the embedding target, to assume a square-mean of the values of the basic unit as a square-mean of the frequency component value in the frequency domain after the spreading of said sets and to calculate the embedding intensity of the digital watermark based on the square-mean of said frequency component value is further provided, and said watermark embedding means embeds the digital watermark in said embedding target by using said embedding intensity. A similar advantage to the fifth digital watermark embedding device as mentioned above can be achieved in the first to fourth digital watermark embedding device as mentioned above.

The seventh digital watermark embedding device according to the present invention, in the first to sixth digital watermark embedding device as mentioned above, the digital data is image data, and said basic unit is a pixel which constructs the image. The advantage of the first to sixth digital watermark embedding device as mentioned above can be achieved for image data.

The digital information distribution device according to the present invention, in the first to seventh digital watermark embedding device as mentioned above, means to input digital data in which the digital watermark is embedded by the digital watermark embedding device according to any one of above-mentioned digital watermark embedding device; and means to distribute said digital data. The advantage of the distribution data same as the first to seventh digital watermark embedding device as mentioned above can be achieved.

The first digital watermark detection device which detects the digital watermark from the digital watermark detection target which consists of digital data according to the present invention is characterized by comprising: spread spectrum means to set a spreading block which includes said detection target of more than two adjacent basic units among basic units which construct said detection target to be a unit in which the spread spectrum is performed, and to perform the spread spectrum of said detection target by multiplying a same pseudo-random number signal to a basic unit in a same spreading block; and watermark detection means to detect the digital watermark from the detection target to which the spread spectrum is performed by said spread spectrum means. Digital watermark information processed so that the energy of digital watermark information embedded by the direct sequence spread spectrum method is not distributed to the high frequency region in the inverse spread spectrum process can be detected.

The digital watermark detection device which detects the digital watermark from the digital watermark detection target which consists of digital data according to the present invention is characterized by comprising: average value calculation means to set said detection target to be a unit averaging block which calculates an average of the averaging block in which said detection target includes more than two adjacent basic units of each base which constructs the plurality of basic units, and calculate an average of the plurality of basic units at every said averaging block; data shift means to shift basic value of each said plurality basic units which belong to said averaging block by calculating a difference of each averaging block with the average value of basic value of each said plurality basic units which belong to the averaging block and the corresponding averaging block; spread spectrum means to perform a spread spectrum of the detection target to which the value is shifted by said data shift means; and watermark detection means to detect the digital watermark from the detection target to which the spread spectrum is performed by said spread spectrum means. When embedding digital watermark information by the direct sequence spread spectrum method, watermark information processed so that the dispersion in the data distribution converted into the frequency domain by the spread spectrum and the orthogonal transformation may become small can be detected.

The third digital watermark detection device which detects the digital watermark from the digital watermark detection target which consists of digital data according to the present invention is characterized by comprising: average value calculation means to set said detection target to be a unit averaging block which calculates an average of the averaging block in which said detection target includes more than two adjacent basic units of each base which constructs the plurality of basic units, and calculate an average of the plurality of basic units at every said averaging block; data shift means to shift basic value of each said plurality basic units which belong to said averaging block by calculating a difference of each averaging block with the average value of basic value of each said plurality basic units which belong to the averaging block and the corresponding averaging block; spread spectrum means to set a spreading block which includes said detection target of more than two adjacent basic units among basic units which construct said detection target to be a unit in which the spread spectrum is performed, and to perform the spread spectrum of said detection target by multiplying a same pseudo-random number signal to a basic unit in a same spreading block; and watermark detection means to detect the digital watermark from the detection target to which the spread spectrum is performed by said spread spectrum means. The advantage in which the first and second digital watermark detection devices as mentioned above are combined can be achieved.

The fourth invention according to the present invention, in the third digital watermark detection device as mentioned above, the spreading block is smaller data size than that of said averaging block, and is included in said,averaging block. The third digital watermark detection device as mentioned above can be easily achieved.

The fifth digital watermark detection device according to the present invention, in the first to fourth digital watermark detection device as mentioned above, the digital data is assumed to be image data, and said basic unit a pixel which constructs an image. When the digital watermark is embedded in the image, the advantage of the first to fourth digital watermark detection devices can be achieved.

The digital information distribution device according to the present invention is characterized by comprising by means to input the digital data which distributes or is distributed; and the digital watermark detection device of the above-mentioned first to fifth inventions. The advantage of the first to fifth digital watermark detection devices as mentioned above can be achieved for the digital data which distributes or is distributed.

The first storage medium according to the present invention is a storage medium which records the program to achieve the first digital watermark embedding device as mentioned above in the computer. The computer controlled by the program read from this storage medium functions as the first digital watermark embedding device as mentioned above.

The second storage medium according to the present invention is a storage medium which records the program to achieve the second digital watermark embedding device as mentioned above in the computer. The computer controlled by the program read from this storage medium functions as the second digital watermark embedding device as mentioned above.

The third storage medium according to the present invention is a storage medium which records the program to achieve the fifth digital watermark embedding device as mentioned above in the computer. The computer controlled by the program read from this storage medium functions as the fifth digital watermark embedding device as mentioned above.

The fourth storage medium according to the present invention is a storage medium which records the program to achieve the sixth digital watermark embedding device as mentioned above in the computer. The computer controlled by the program read from this storage medium functions as the sixth digital watermark embedding device as mentioned above.

The fifth storage medium according to the present invention is a storage medium which records the program to achieve the first digital watermark detection device as mentioned above in the computer. The computer controlled by the program read from this storage medium functions as the first digital watermark detection device as mentioned above.

The sixth storage medium according to the present invention is a storage medium which records the program to achieve the second digital watermark detection device as mentioned above in the computer. The computer controlled by the program read from this storage medium functions as the second digital watermark detection device as mentioned above.

The seventh storage medium according to the present invention characterized by having a structure in which a digital watermark is embedded by the above-mentioned digital watermark embedding device. A similar advantage to the first to seventh digital watermark embedding devices as mentioned above is performed by the data stored in this storage medium.

The record medium according to the present invention may be manufactured by embedding watermark with the above-mentioned digital watermark embedding divide (and/or method).

As described above in detail, according to the present invention, it is possible to provide a digital watermark embedding device, a detection device, and a storage medium each of which becomes possible not to distribute the energy of digital watermark information embedded by the direct sequence spread spectrum method to the high frequency region in the inverse spread spectrum process, and digital watermark information may be hard to disappear.

According to the present invention, it is possible to provide a digital watermark embedding device, a detection device, and a storage medium each of which can embed watermark information, when embedding digital watermark information by the direct sequence spread spectrum method, the dispersion in the data distribution converted into the frequency domain by the spread spectrum and the orthogonal transformation can become small, and it is hard to disappear even by small embedding intensity.

In addition, according to the present invention, it is possible to provide a digital watermark embedding device, a detection device, and a storage medium, when digital watermark information is embedded by the direct sequence spread spectrum method, a high-speed watermark embedding can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A and FIG. 4B are figures to explain the first feature of the present invention;

FIG. 5 is a figure which shows a circumstance occurred when digital watermark information is detected and extracted;

DETAILED DESCRIPTION OF THE INVENTION

Figure 1A:
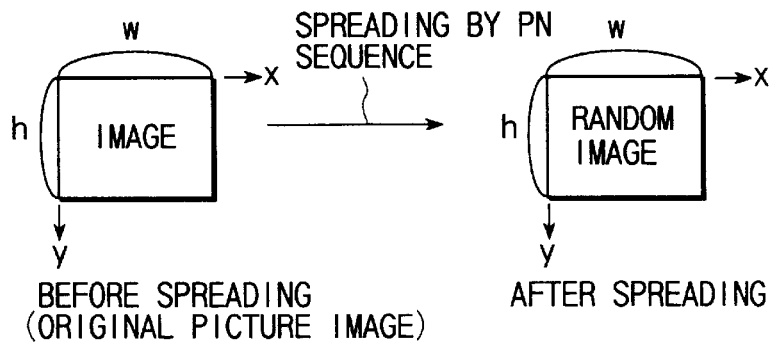
FIG. 1A to FIG. 1C are figures which show an appearance to perform the spread spectrum first in the direct sequence spread spectrum method.
Figure 1B:
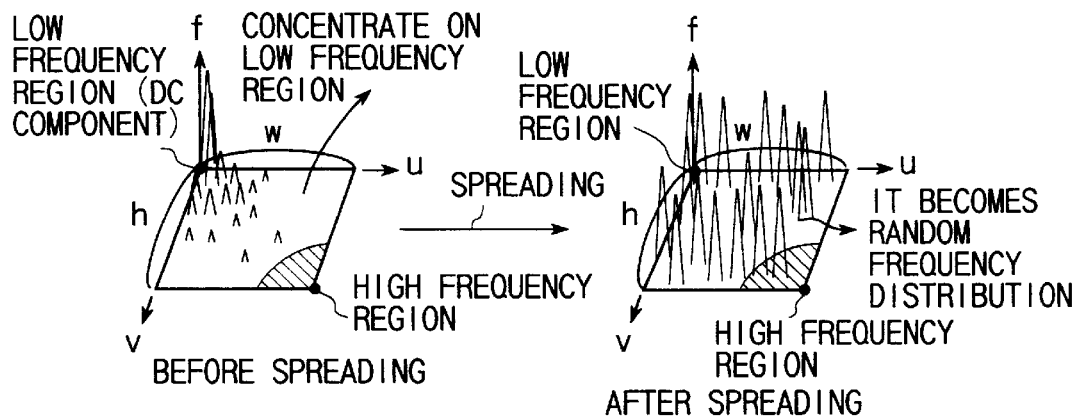
Figure 1C:
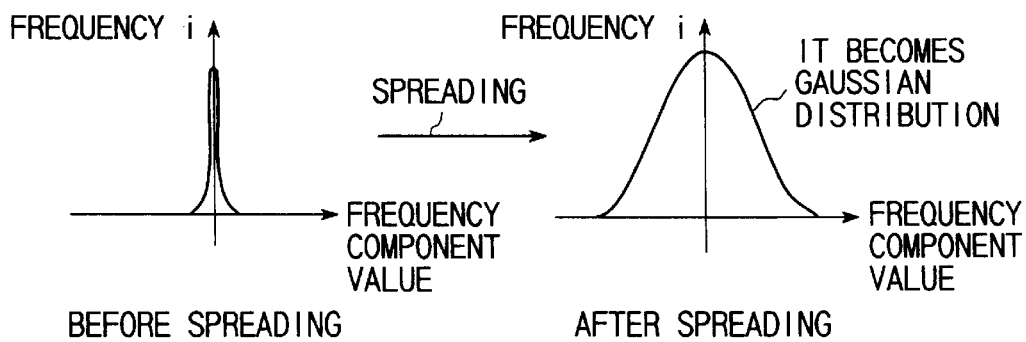
Figure 2:
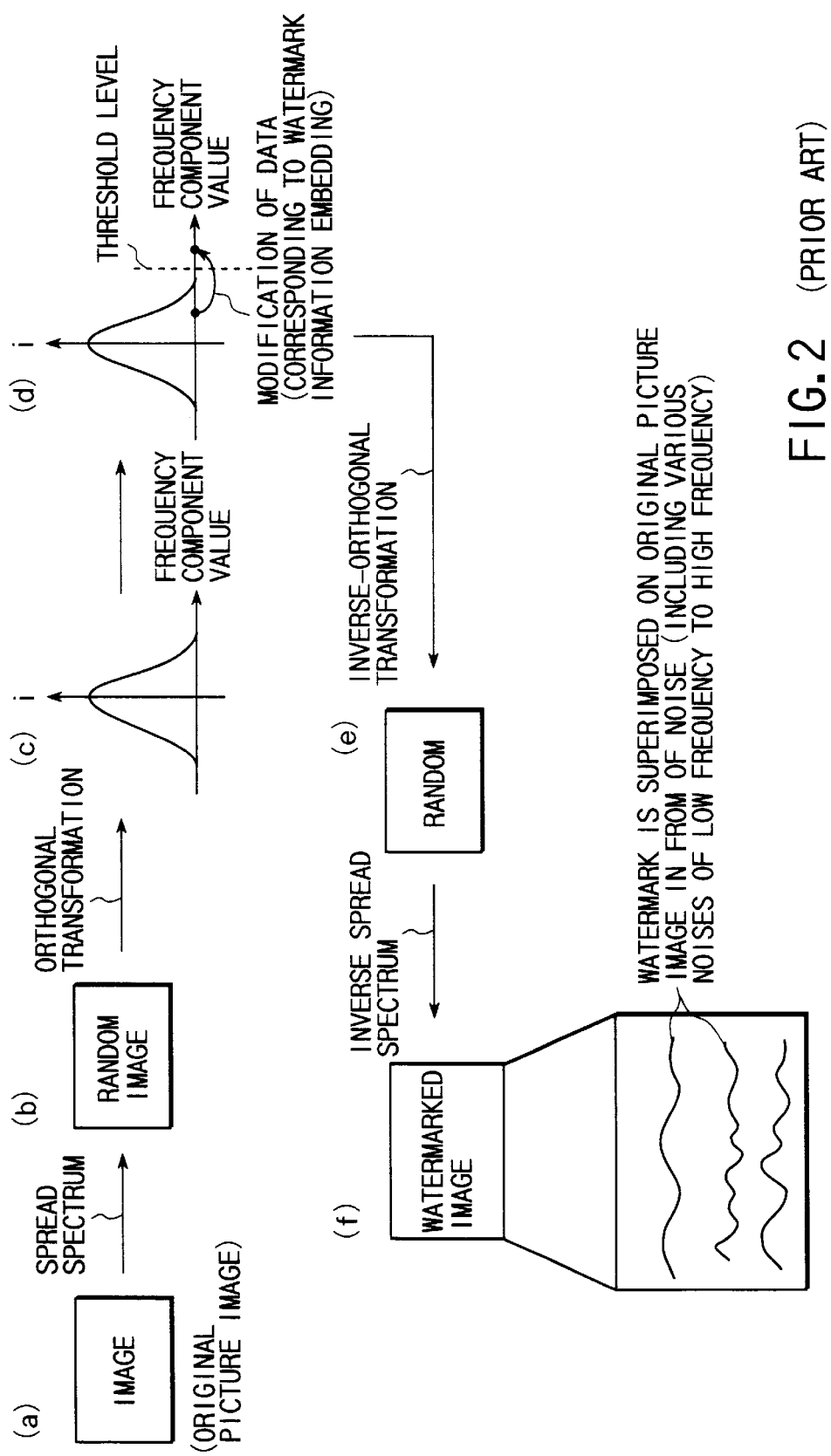
FIG. 2 is a figure which shows an appearance to embed watermark information by the direct sequence spread spectrum method and perform the inverse spread spectrum.
Figure 3A:
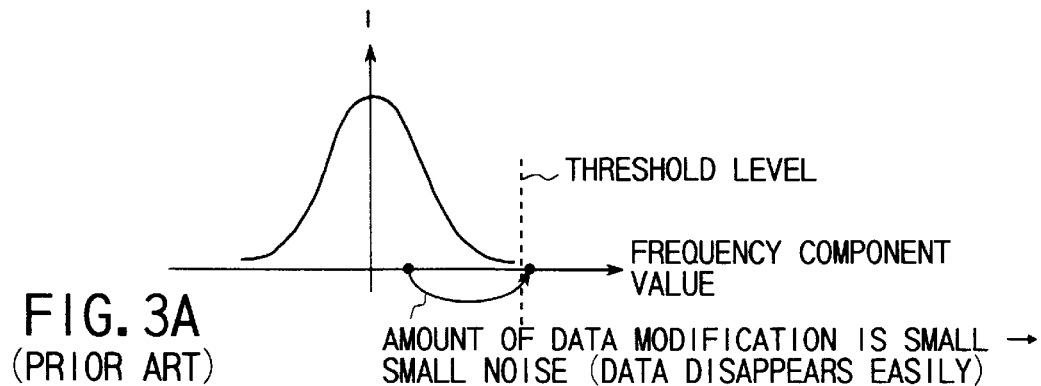
FIG. 3A to FIG. 3D are figures which show data distribution in frequency domain to explain problems of information embedding in direct sequence spread spectrum method.
Figure 3B:
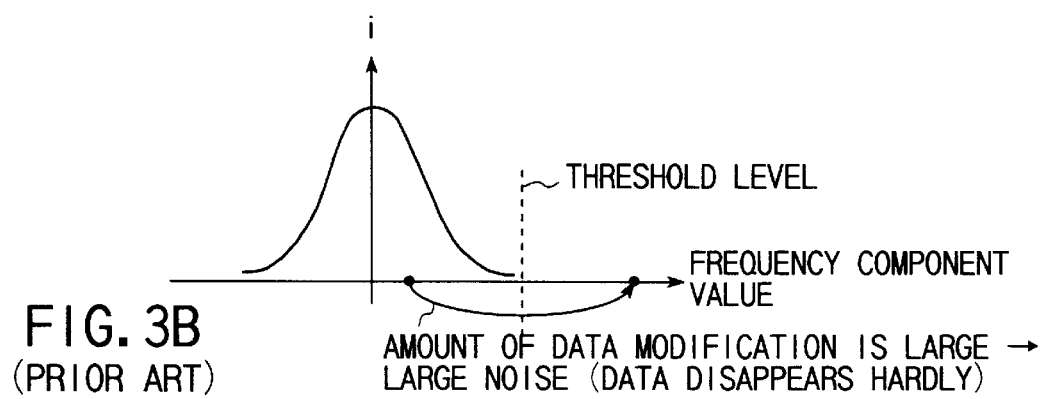
Figure 3C:
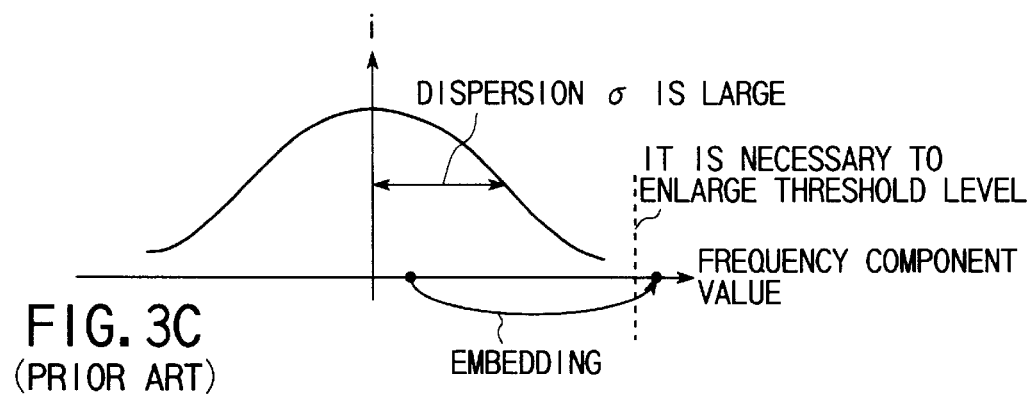
Figure 3D:
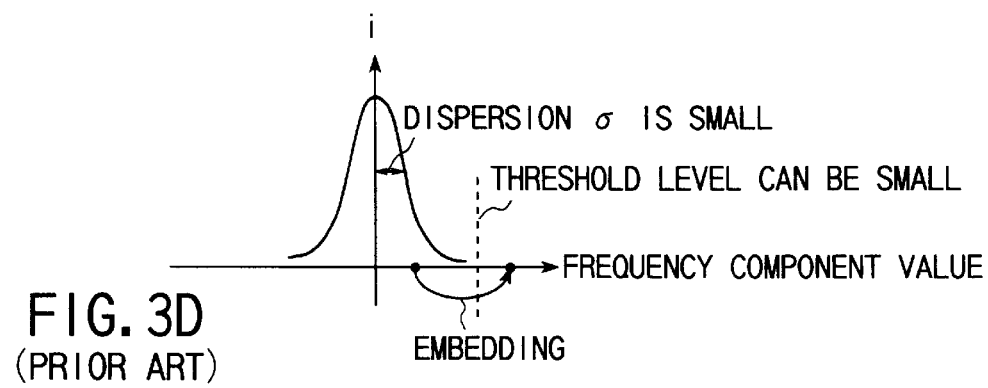

Hereinafter, an embodiment of the present invention will be explained.

The improved direct sequence spread spectrum method used in this embodiment has three features explained as follows. First, a technical study of the improved direct sequence spread spectrum method is performed, and thereafter, specific embodiment will be explained.

First, here, the first feature in improved direct sequence spread spectrum method according to this embodiment will be explained.

In the direct sequence spread spectrum method, since a inverse-spread spectrum of embedded digital watermark information is performed, the energy of embedding is distributed to the high frequency component of the image etc. The frequency here corresponds to the wave of the data value generated based on the pixel. That is, the wave when the pixel data is changed to the wave-like over two or more pixels is frequency information, and digital watermark information is a wave of the pixel data within the wide range (watermark information as the noise) according to the spread spectrum (inverse spreading). Here, a case of becoming a high frequency is a case that wave changes as the wave repeats the increase and decrease by a little number of pixels.

The inventor pays attention to the fact that the pixel data changes by the pixel unit, and in addition, becomes a high frequency when the wave changes by a little number of pixels, and proposes the method of not distributing the watermark energy to the high frequent component when performing inverse spreading. That is, the spread spectrum is not performed by the pixel unit, and the spectrum spreading is performed by larger unit than a single pixel which consists of two or more pixels.

Thus, when spreading, embedding, and inverse-spreading by two or more pixel unit, the watermark energy distributed to the original picture image is distributed to the high frequency component when thinking by two or more pixel unit. However, when thinking as a set of image of the pixel, the high frequency component value for two or more pixel unit is not a high frequency. The reason is that, even if information changes rapidly for two or more pixel unit, it is only a gradual change for the pixel unit.

FIG. 4A and FIG. 4B are figures to explain the first feature of the present invention.

In the embodiment, to achieve the above-mentioned invention, the spreading block which consists of two or more pixels as a unit which performs the spread spectrum and inverse-spreading is introduced. FIG. 4A shows a case that 2×2 pixels to be a spreading block, and FIG. 4B shows a case that 2×2 pixels to be a spreading block. Thus, the watermark energy is substantially prevented being distributed to the high frequency domain by spreading by two or more pixel unit (spreading block), and embedding watermark information at the state and performing inverse-spreading.

Next, to explain the second and third features in the improved direct sequence spread spectrum method according to this embodiment, the reliability model to which the probability where the embedded watermark is correctly detected is quantitatively given will be examined.

A sets of pixels which constructs image is indicated by M, and a set of the frequency component which constructs the frequency domain is indicated by P. The value of the pixel x≡(x1, x2)∈ M is assumed to be f(x)=f(x1, x2). The pixel value of the image obtained by direct sequence spread spectrum by PN sequence p(x) is as shown in equation (1).

$$\tilde{f}(x) = p(x) f(x) \qquad (1)$$

The frequency component obtained by orthogonalizing this image is converted and is shown in equation (2).

$$\tilde{F}(u) = \sum_{x \in M} A(u, x) \tilde{f}(x), \qquad (2)$$

Here, A(u, x) is the matrix element of the orthogonal transformation, and it is assumed to satisfy equation (3) and equation (4).

$$\sum_{u \in P} A(u, x) A(u, x') = \delta(x, x') \qquad (3)$$

$$\sum_{x \in M} A(u, x) A(u', x) = \delta(u, u') \qquad (4)$$

Here, a simple algorithm is given for convenience' sake as an embedding algorithm of the digital watermark.

1. A set Q={$u_i | u_i \in P$, i=1,2, . . . L in the embedded position in the predetermined frequency domain is selected. Here, L is an embedded data size.

2. Variation $\Delta \tilde{F}(u_i)$ of the frequency component value in each embedded position is decided. It is assumed $\Delta \tilde{F}(u_i)$=+λ when 1 is embedded, and it is assumed $\Delta \tilde{F}(u_i)$=−λ when 1 is embedded. Here, λ is a parameter which shows strength of embedding.

3. The variation of each pixel value is given by the following equation (5):

$$\Delta f(x) = p(x) \sum_{u \in Q} A^{-1}(x, u) \Delta \tilde{F}(u), \qquad (5)$$

4. Each pixel value is changed to f(x)→f(x)+Δf(x).

f(x)→f(x)+Δf(x) The following case is considered as an extraction algorithm of the digital watermark corresponding to this.

1. The frequency component value $$\tilde{F}(u) = \sum_{x \in M} A(u, x) p(x) f(x)$$

is calculated to each element of Q selected at embedding.

2. If calculated $\tilde{F}(u)$ is $|\tilde{F}(u)|$>T, it is decided that watermark information is embedded.

3. Further, it is decided that 1 is embedded when $\tilde{F}(u)$ is positive and 0 is embedded when $\tilde{F}(u)$ is negative.

The above-mentioned embedding algorithm and the detection algorithm are given for convenience' sake as assumption of the following equation developments, and the invention shown by the embodiment is not limited to this algorithm.

On the other hand, false positive ratio and false negative ratio are general as the index which shows the reliability of detection. The false positive ratio is a probability which performs the error judgment as embedding when the digital watermark is not embedded. On the other hand, the false negative ratio is a probability which performs the error judgment as not embedding when the digital watermark is embedded.

In addition, extraction error rate which corresponds to the decoding error rate in the code theory is defined. The false extraction rate is a probability which performs the error judgment that 1 is embedded when 0 is embedded and a probability which performs the error judgment that 0 is embedded when 1 is embedded. The false positive ratio, the false negative ratio, and the extraction error rate depend on the operation performed to the image for the digital watermark algorithm, embedding, and the extraction, and the character of the image.

In general, there is a possibility as shown in FIG. 5 in detection and the extraction.

FIG. 5 is a figure which shows the circumstance occurred when digital watermark information is detected and extracted.

Since the pixel value of each pixel can be considered as it is an independent variable by spreading by the PN sequence, the frequency component value of the spreaded image can be approximated by the Gaussian distribution by central-limit theorem.

Here, the second feature in the improved direct sequence spread spectrum method according to this embodiment will be explained.

If the expected value of the frequency component value of the spreaded image is given according to the space average, the expected value becomes:

$$E_P[\tilde{F}(u)] = E_P\left[\sum_{x \in M} A(u, x)p(x)f(x)\right], \quad (6)$$

$$= \frac{1}{|P|}\sum_{x \in M}\left(\sum_{u \in P} A(u, x)\right)p(x)f(x),$$

$$= 0.$$

The expected value becomes naturally 0 for the expected value of the DC component because of spreading by the PN sequence.

Therefore, the expected value becomes $$E_P[\tilde{F}(u)^2] = E_P\left[\sum_{x \in M} A(u, x)p(x)f(x)\sum_{x' \in M} A(u, x')p(x')f(x')\right], \quad (7)$$

$$= \frac{1}{|P|}\sum_{x \in M}\sum_{x' \in M}\left(\sum_{u \in P} A(u, x)A(u, x')\right)p(x)p(x')f(x)f(x'),$$

$$= \frac{1}{|M|}\sum_{x \in M} f(x)^2,$$

$$= E_M[f(x)^2],$$

and becomes equal to the square-mean of the pixel value of a previous spreading.

The dispersion of the frequency component value is given by the square-mean of the pixel value of a image before spreading.

That is, it is proven that dispersion σ of the pixel value before spreading and dispersion σ of the frequency component value after spreading and the orthogonal transformation become equal from equation (6) and equation (7). Therefore, in the improved direct sequence spread spectrum method used in this embodiment, even if a orthogonal transformation and an inverse-orthogonal transformation of the entire original picture image are not performed, the embedding intensity λ to be used for the watermark information embedding in the frequency domain based on this dispersion can be decided. That is, since dispersion σ of the frequency component value after the orthogonal transformation is known, it is possible to use the embedding intensity λ which exceeds the threshold and is a weak intensity (low energy) to extent to which the image etc. are not deteriorated.

$$\lambda = \text{func } (E_B[f(x)^2]) \quad (8)$$

$$\lambda = \alpha E_B[f(x)^2] + \beta \quad (9)$$

$$\lambda = \alpha \sqrt{E_B[f(x)^2]} + \beta \quad (10)$$

Here, the embedding intensity λ shown by equation (8) is a general form and Func( ) is an arbitrary function. The embedding intensity λ is calculated in this embodiment in the form of equation (9) or equation (10) as an example of a specific form of Func( ).

Next, the third feature in improved direct sequence spread spectrum method according to this embodiment will be explained.

When the frequency component value of the embedded position exceeds a threshold value T, if it is judged that watermark information is embedded, it is shown as:

The false positive rate $P_{FP}$ is shown by using the error function Erf $z = \int_{()}^{\infty} \exp(-t^2)dt$ as follows:

$$P_{FP} = \frac{1}{2} - \frac{1}{\sqrt{2\pi E_P[\tilde{F}(u)^2]}} Erf \frac{T - E_P[\tilde{F}(u)]}{\sqrt{2E_P[\tilde{F}(u)^2]}}, \quad (11)$$

$$= \frac{1}{2} - \frac{1}{\sqrt{2\pi}\,\sigma_{\tilde{F}}} Erf \frac{T}{\sqrt{2}\,\sigma_{\tilde{F}}}.$$

It is expected that the false positive ratio can be reduced by reducing dispersion $\sigma_{\tilde{F}}$ of the frequency component value after spreading.

This value $\sigma_{\tilde{F}}$ is a value which depends on an individual image. It is not appropriate to assume ergodicity and to consider this expected value to be an expected value by the average of the ensemble. Therefore, the reliability of the digital watermark strongly depends on an individual image in general in the direct sequence spread spectrum method.

Then, in this embodiment, the average of the entire target (including the case of dividing into the embedding unit) in which watermark information is embedded is not taken, this target is further divided into the plurality of blocks (averaging blocks), the average of the pixel value is taken at this every averaging block, and the average value is subtracted from the pixel value.

Figure 6A:
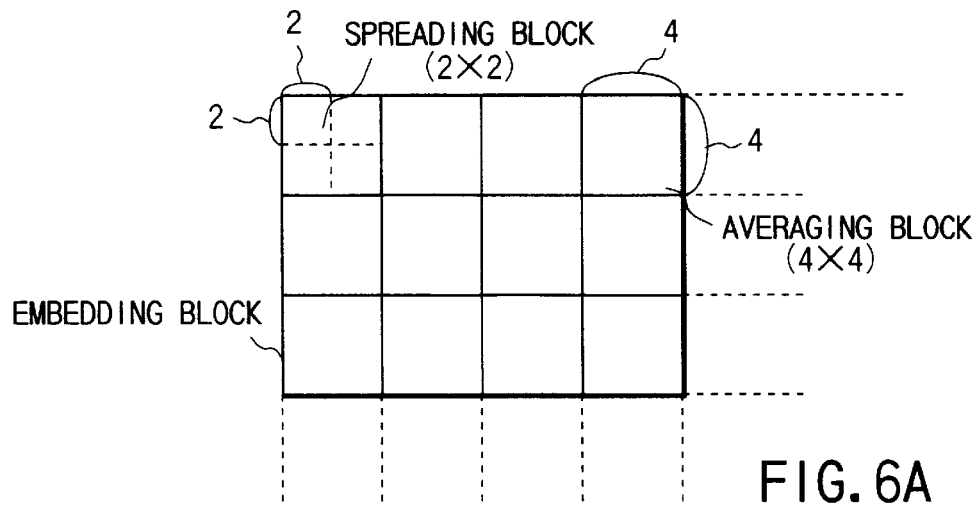
FIG. 6A and FIG. 6B are figures to explain the third feature of the present invention.
Figure 6B:
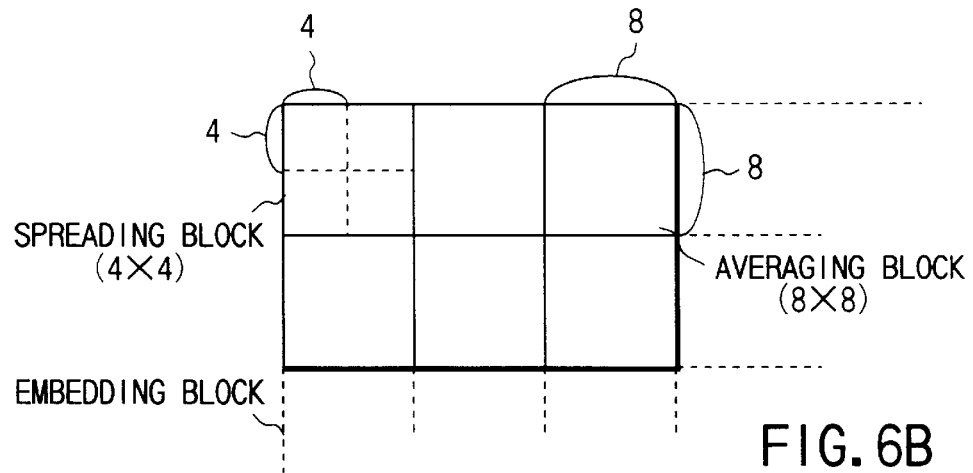

FIG. 6A and FIG. 6B are figures to explain the third feature of the present invention. FIG. 6A indicates the case to assume 4×4 pixels to be an averaging block, and FIG. 6B indicates the case to assume 8×8 pixels to be an averaging block.

Figure 7A:
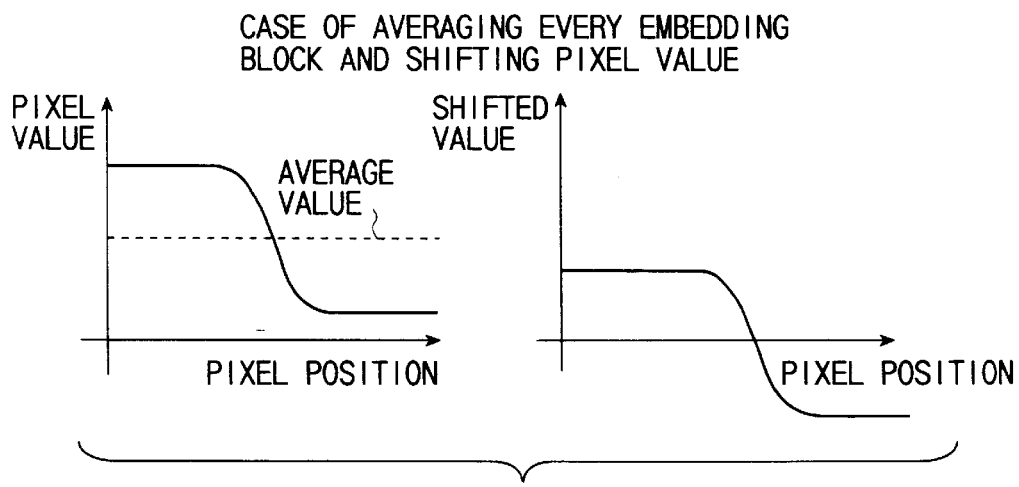
FIG. 7A and FIG. 7B are figures which compare a case to obtain the average of the pixel every the embedding block with a case to obtain the pixel average every averaging block.
Figure 7B:
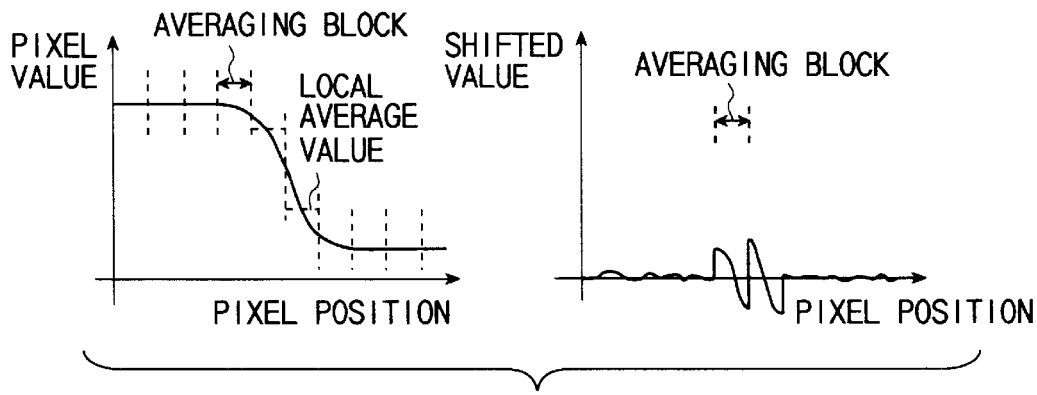

It is not an embedding block unit which becomes a target in which watermark information is embedded, and by obtaining the pixel average for averaging block unit shown in FIG. 6A and FIG. 6B and shifting the pixel value by using this, the dispersion a becomes small as shown in FIG. 7A and FIG. 7B.

As is apparent from FIG. 7A and FIG. 7B, if the average of the pixel is taken every averaging block and the pixel value shifts, the range of distribution of the shift value becomes small, and dispersion a can be reduced.

Figure 8:
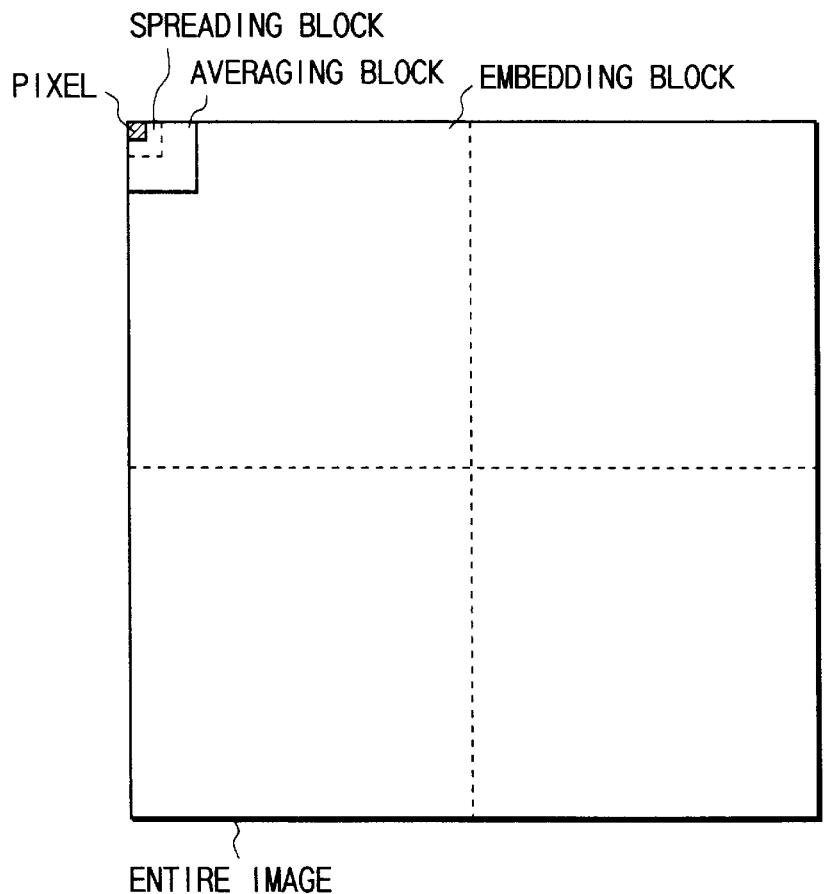
FIG. 8 is a figure which shows each block used for the embodiment of the present invention.

FIG. 8 is a figure which shows each block used for embodiment of the present invention.

As shown in FIG. 8, a set of pixels constructs the entire image, and this entire image is divided into the embedding blocks. The embedding block is a unit to which watermark information is embedded, and is generally constructed that the image is divided into the sizes of about 64×64 pixels, 128×128 pixels or 256×256 pixels. The embedding block can be corresponding to the entire image.

The embedding block is divided into the averaging block of the size equal to or less than the embedding block (usually, less than the embedding block), or is divided into the spreading block. Both of averaging and spreading blocks are larger than one pixel. It is preferable that the size of the averaging block is larger than the size of the spreading block as shown in FIG. 7A to FIG. 8 to make processing more valid. In addition, it is more desirable when the block is configured that the spreading block is included in the averaging block.

The above description is a main feature of the present invention, next, specific pattern will be explained to achieve present invention.

Figure 9:
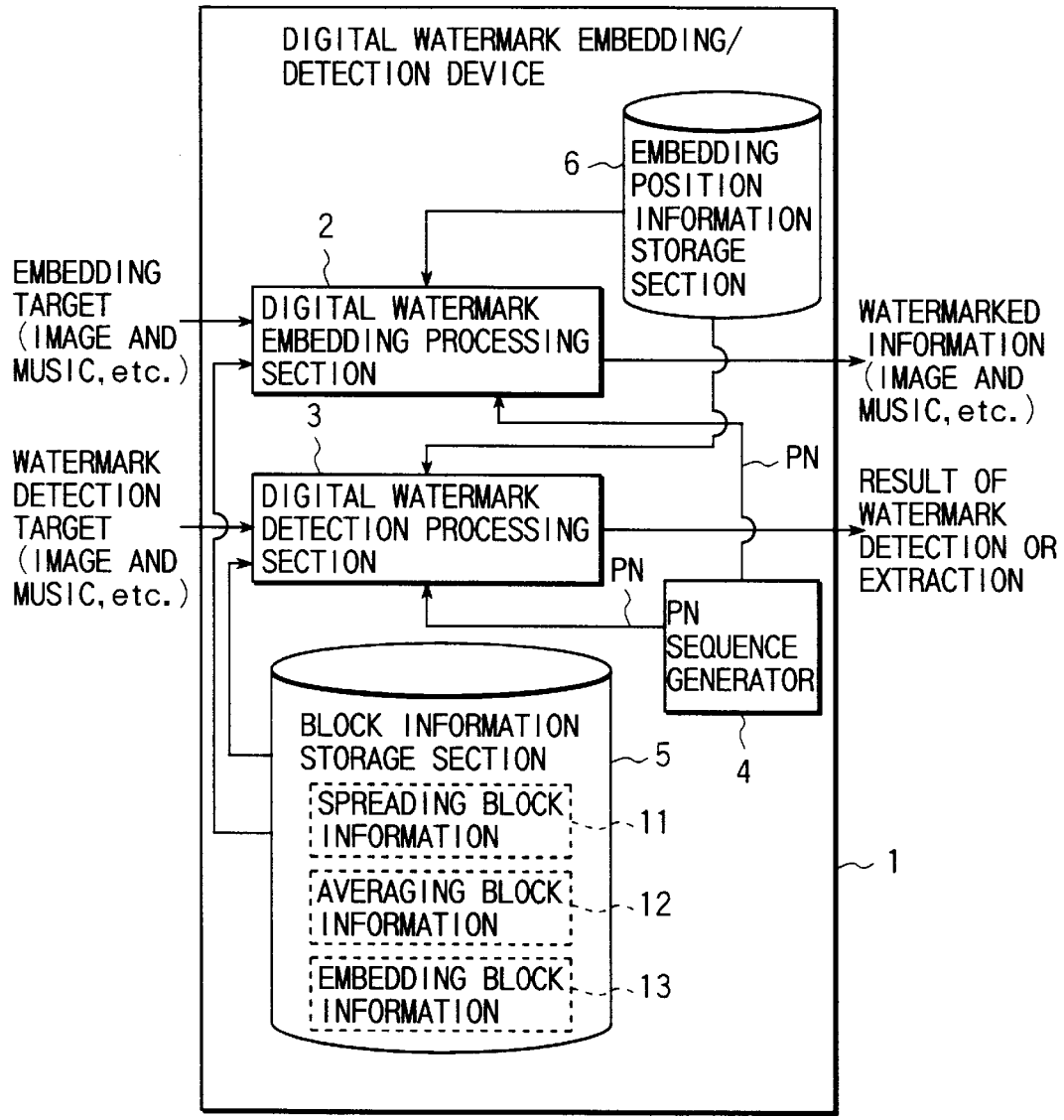
FIG. 9 is a block configuration figure which shows an example of digital watermark embedding/detection device according to an embodiment of the present invention.

FIG. 9 is a block configuration figure which shows an example of the digital watermark embedding/detection device according to the embodiment of the present invention.

Digital watermark embedding/detection device 1 of FIG. 9 has digital watermark embedding processing section 2, digital watermark detection processing section 3, PN sequence generator 4, block information storage section 5, and embedding position information storage section 6. In FIG. 9, though the digital watermark embedding device and the digital watermark detection device are constructed as one body, these devices may be separate devices, respectively. In that case, either one of detection processing section 3 or embedding processing section 2 becomes unnecessary, respectively in each device.

First here, digital watermark embedding processing section 2 inputs the embedding target, which is digital data of the image and music, etc., of the digital watermark, executes the embedding processing, and outputs embedded information in which digital watermark information has been embedded. To execute this embedding processing, spreading block information 11, averaging block information 12, embedding block information 13, and the watermark embedding position information are input, and the PN sequence signal is input from the PN sequence generator 4.

Digital watermark detection processing section 3 inputs the watermark information detection target with the possibility that digital watermark information is embedded, executes the detection/extraction processing, and outputs the detection result whether the digital watermark is embedded and the digital watermark extraction result in case of watermark being embedded. To execute this detection/extraction processing, spreading block information 11, averaging block information 12, embedding block information 13, and the watermark embedding position information are input, and the PN sequence signal is input from the PN sequence generator 4. In general, the detection processing is the detection of the presence of watermark, the extraction processing is the watermark extraction, but the extraction processing is sometimes included to the detection processing in this specification.

PN sequence generator 4 generates the PN sequence signal used in the embedding processing and the detection/extraction processing, and gives it to digital watermark embedding processing section 2 or digital watermark detection processing section 3.

Block information storage section 5 stores spreading block information 11, averaging block information 12, and embedding block information 13, and gives these information to digital watermark embedding processing section 2 or digital watermark detection processing section 3.

Embedding position information storage section 6 stores information which becomes the origin of embedded position information of watermark information or embedded position information, and gives embedding position information to digital watermark embedding processing section 2 or digital watermark detection processing section 3. The digital watermark is embedded based on this embedding position information and embedding intensity information.

Next, operation of digital watermark embedding device and the detection device in this embodiment constructed like this will be explained. The case where the watermark information embedding target is image data in the following explanations will be handled.

Figure 10:
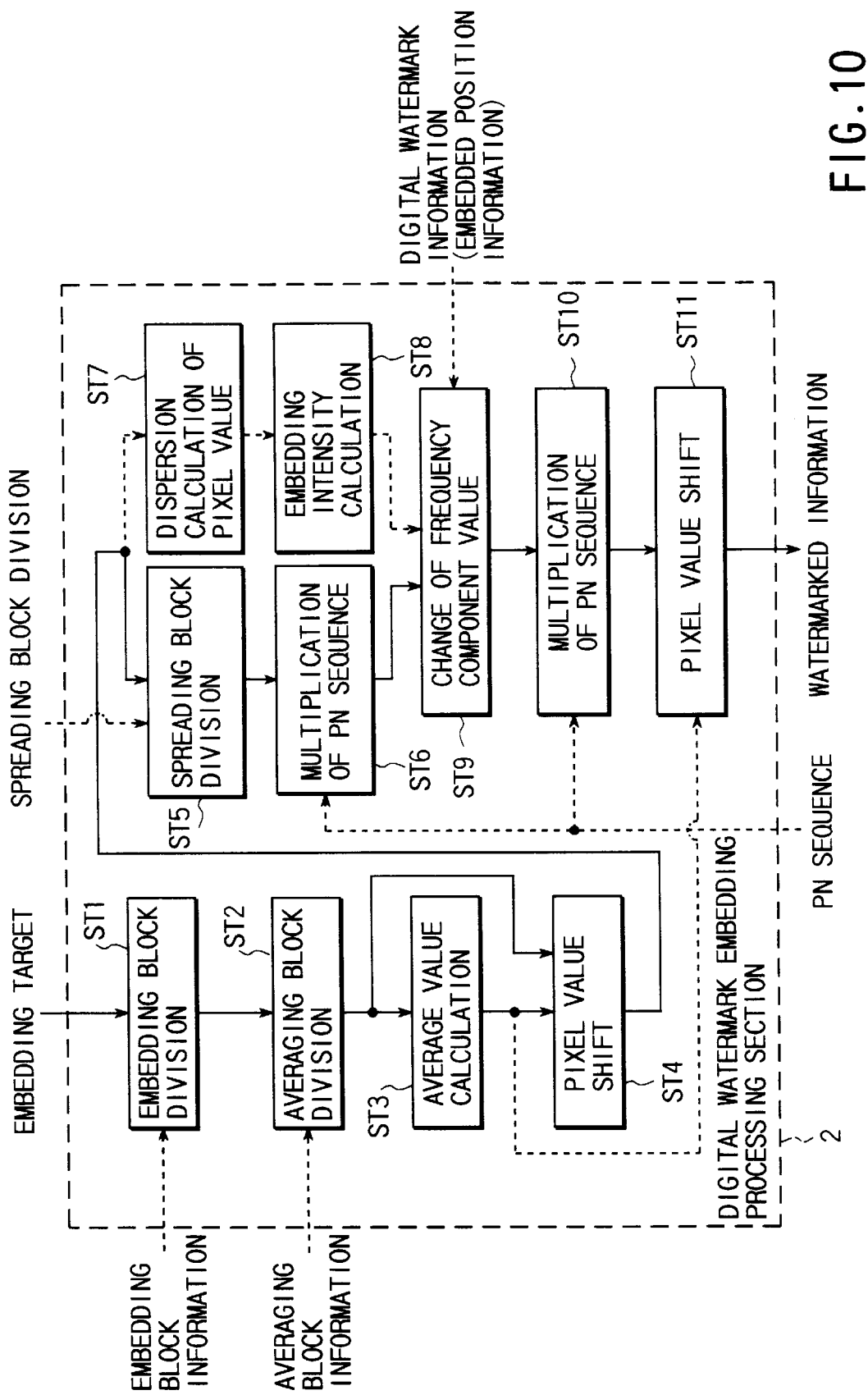
FIG. 10 is a flowchart which shows processing in digital watermark information embedding processing section.

FIG. 10 is a flowchart which shows processing in the digital watermark information embedding processing section.

Each processing ST1 to step ST11 shown in FIG. 9 can be considered as a function means at the same time as the processing procedure. These are the processings which are specifically executed according to program.

In the digital watermark embedding processing, first,
image data which is the embedding target of watermark information is input, and is divided into the embedding block based on embedding block information from block information storage section 5 (step ST1). Watermark information is embedded in each embedding block, and here, attention is pained to one embedding block to explain as follows. When the entire image is treated as an embedding block of one, this processing is unnecessary.

Next, the embedding block is further divided into the averaging block based on averaging block information from the block information storage section 5 (step ST2).

The plurality of image data which is divided into the plurality of averaging blocks are delivered to average value calculation processing (step ST3) and pixel value shift processing (step ST4). In average value calculation processing (step ST3) among these, the average of pixel value is calculated for each averaging block, and each averaging block is delivered to pixel value shift processing (step ST4, step ST11).

In pixel value shift processing (step ST4), the pixel value in each averaging block received from averaging block division (step ST2) is subtracted by the average value of the corresponding averaging block (limited part average value), as a result, the shift of the pixel value is executed.

Thus, dispersion σ is reduced by redefining the pixel value by the difference from the average value in processings of step ST2 to step ST4. Especially, when the size of the embedding block is large, dispersion σ becomes smaller by using a spatial locality of the pixel value which a natural image has, defining a local average value of the image and redefining the pixel value as a difference from the local average value.

Image data to which pixel value shift processing (step ST4) is performed is delivered to spreading block division processing (step ST5) and dispersion calculation processing (step ST7) of the pixel value.

Here, in spreading block division processing (step ST5), image data to which the pixel value is shifted is divided into the spreading block based on spreading block information from the block information storage section 5. In addition, the PN sequence signal of the PN sequence generator from four is multiplied in the unit of the spreading block and the spectrum spreading is performed to image data. The same random numbers value (PN value) is multiplied to the pixel value in the spreading block.

In these processings of step ST5 and step ST6, it is controlled so that the frequency domain where the watermark can be embedded becomes low intermediate frequency domain by controlling the scale (size) of the spreading block. That is, it is not an individual pixel, one random numbers value of the PN sequence is multiplied to the spreading block (there is not necessarily necessity which is the rectangle) which consists of the plurality of adjacent pixel, and the pixel value is changed. The energy of watermark information distributed by the inverse-spreading described later becomes possible to be concentrated to the lower frequency region than the scale by controlling the scale of this spreading block.

On the other hand, in dispersion calculation processing (step ST7) of the pixel value, the square-mean of the pixel value in which the spread spectrum is not performed is calculated based on image data that the pixel value shift processing is performed. This calculated square-mean is a square of dispersion a of the frequency component value as shown in equation (7). At this time, the obtained dispersion $\sigma$ is small enough by processings of step ST2 to step ST4.

In addition, the embedding intensity $\lambda$ of the digital watermark is calculated based on this dispersion $\sigma$ (or, average the square) (step ST8). This embedding intensity calculation is performed by equation (9) or equation (10).

Next, digital watermark information is embedded to the image data value to which the spectrum diffuses by multiplication of PN sequence processing (step ST6) by the embedding intensity $\lambda$ calculated by embedding intensity calculation processing (step ST8) (step ST9). In this case, watermark information can be embedded by changing the value of the frequency component in the frequency domain since the embedding intensity $\lambda$ based on dispersion $\sigma$ of the frequency component value after spreading can be used though the entire image data is a pixel domain. Embedding position information is given from embedding position information storage section 6 to change processing (step ST9) of the frequency component value.

Next, the PN sequence of the PN sequence generator 4 is multiplied to image data in which watermark information is embedded as well as processing ST6 every spreading block, and an inverse-spectrum spreading is performed (step ST10).

Then, image data, to which the inverse spreading is performed, is restored to original image (step ST11) by shifting the pixel value at every averaging block based on each pixel average value obtained by average value calculation processing (step ST3). Thus, image data in which watermark information is embedded is output from the digital watermark embedding processing section 2.

Next, detection/extraction processing of digital watermark information will be explained.

Figure 11:
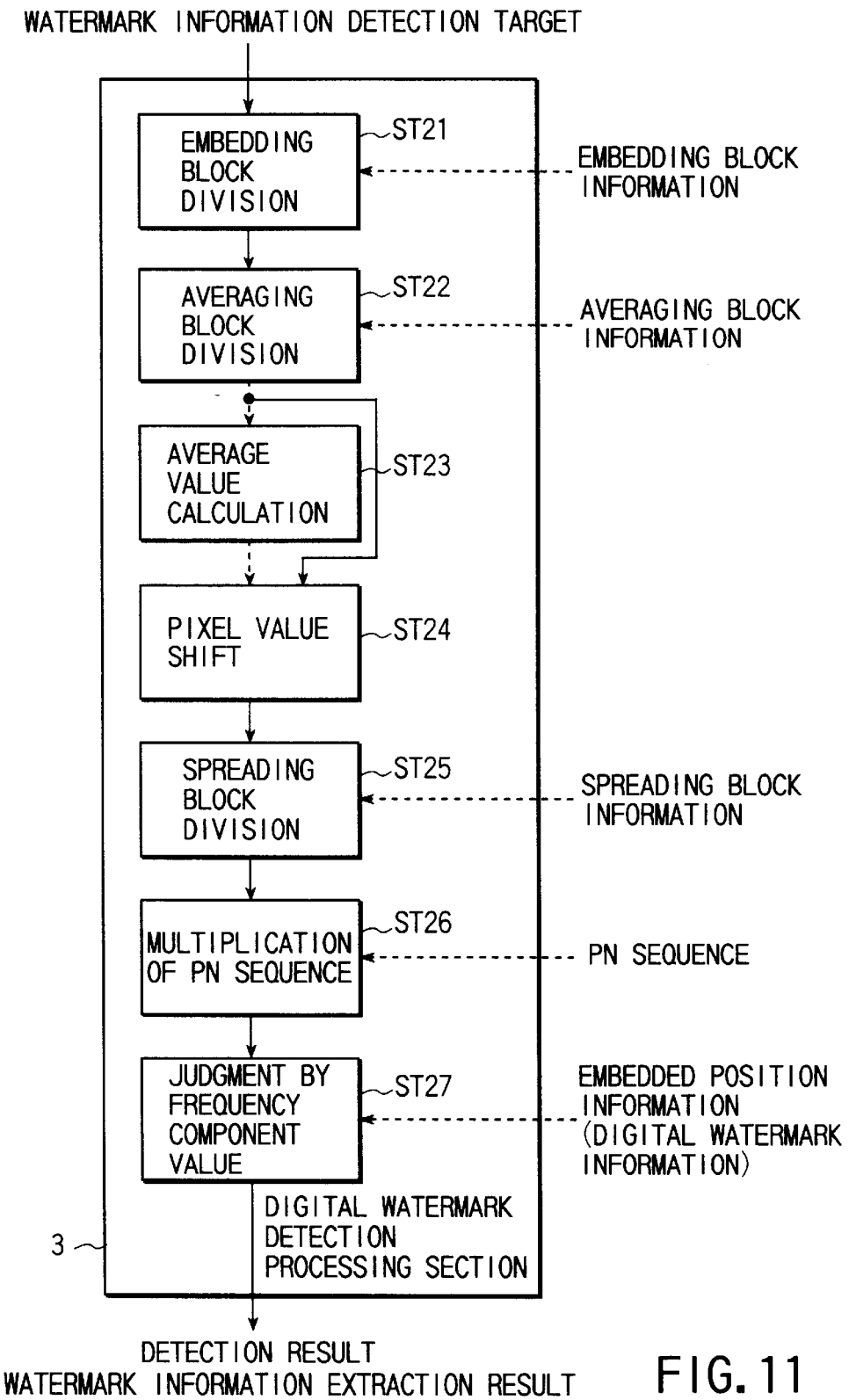
FIG. 11 is a flowchart which shows processing in digital watermark information embedding processing section.

FIG. 11 is a flowchart which shows processing in the digital watermark information embedding processing section.

Each of processings of step ST21 to step ST27 shown in FIG. 11 is a function means at the same time as the processing procedure as well as the case of FIG. 10. These are the processings which are specifically executed by the program.

First, image data which is the watermark information detection target with the possibility that watermark information is embedded is input, and the embedding block division is performed by embedding block information from the block information storage section 5 (step ST21).

Next, the divided embedding block is divided into the averaging blocks based on averaging block information from the block information storage section 5 (step ST22).

Image data that the averaging block division is performed is delivered to image value shift processing ST24, the pixel average value is calculated in the average value calculation processing at each averaging block, and the calculation result is delivered to the pixel shift processing (step ST23).

In pixel shift processing (step ST24), the corresponding pixel average value is subtracted from the pixel value as for image data that the averaging block division is performed at every averaging block every averaging block, and the pixel shift is performed.

Next, image data to which the pixel is shifted is divided into the spreading blocks based on spreading block information from the block information storage section 5 (step ST25).

Next, the PN sequence signal from the PN sequence generator is multiplied to image data to which the pixel is shifted every spreading block as well as processing ST6 of FIG. 10, and the spread spectrum is performed (step ST26).

Embedding position information is used beforehand when target watermark information is detecting extracted is known. Then, embedding position information from embedding position information storage section 6 is used, and whether watermark information is embedded in image data to which the detection spectrum spreaded based on the value of the frequency component in the frequency domain is detected. In addition, embedded digital watermark information is extracted (step ST27).

Then, these detection/extraction results are output from the digital watermark detection processing section 3.

As mentioned above, since the digital watermark embedding device and the detection device according to the embodiment of the present invention spread and embed by the unit of larger spreading block than one pixel in the direct sequence spread spectrum method, the embedding energy can be prevented being dispersed to the high frequency domain when an inverse-spread spectrum is performed. As a result, the fault that digital watermark information is lost easily under the compression/expansion etc. can be eliminated. That is, the characteristics that watermark information remains under the compression/expansion etc. can be improved. Consequently, the hold of watermark information to the D-A-D conversion and the StirMark attack can be raised.

Since digital watermark embedding device and the detection device according to the present invention introduces the averaging block and the image shift is performed, dispersion $\sigma$ in the frequency domain can be reduced regardless of the pixel value distribution statement of the original picture image, as a result, the watermark information embedding can be performed such that it becomes relatively strong embedding intensity $\lambda$ to the threshold though the absolute value is low. Therefore, the capacity of watermark information can be improved without the data quality deterioration in the image deterioration etc.

Therefore, image adjust for each image and image adjust for each part of the image are substantially performed, and the fact such as only watermark information on a small size can be embedded in a large block can be prevented.

Since the square of dispersion $\sigma$ of the frequency component value is equal to the square-mean of a pixel value before spreading by using the knowledge obtained by the equation (7), and the embedding intensity $\lambda$ is obtained by the equation (8), the equation (9) or the equation (10) without performing the orthogonal transformation in the entire image, and the watermark information embedding detection is performed, even when a large size of the block is selected when watermark information is embedded, the digital watermark embedding device of this embodiment and the detection device can reduce the calculation cost of the spread spectrum, the inverse spreading, and the orthogonal transformation and the inversion thereof. Therefore, the digital watermark information embedding which is high-speed and corresponds to dispersion σ as mentioned above frequency domain can be performed.

Therefore, it becomes possible to perform mounting by software even when there is no means except mounting by hardware. In addition, mounting by a small hardware cost becomes possible so far even when the circuit of embedding watermark information is mounted with hardware for performance viewpoint conventionally.

Therefore, it becomes possible to achieve the finger print device to which information of the user and transferring destination is embedded at the use and transfer of the data of the image etc. by embedding high-speed watermark information.

Since the detection of high-speed watermark information is also possible, it is also possible that the usage control and copy control information, and the descramble key are embedded in the data of the image etc., those information is transferred with data, and those information are immediately detected at use.

A method of giving the PN sequence signal to the spreading block in this embodiment is not explained in detail, but it is possible to give a different pseudo-random number at every spreading block in the present invention, and the freedom degree is high. Since basically the setting of the scale of the spreading block can be performed freely, an appropriate size of the block can be set corresponding to the scale of the compression/expansion operation.

In addition, though the idea of the averaging block and the spreading block, etc. is used in this embodiment, digital watermark information is detected and extracted, and watermark information cannot be operated and, consequently, to be erased, if these information is not known. Therefore, if it is assumed averaging block information or spreading block information is secret information, it can be prevented from analyzing the watermarked image to the third party of malice, even when the PN sequence and embedding position information leak.

FIRST EXAMPLE

In above embodiment, the whole of the embedding processing and the detection/extraction processing of digital watermark information is explained referring to FIG. 10 and FIG. 11. More specific sample will be explained as for especially change processing ST9 of the frequency component value and judgment processing ST27 by the frequency component value example in these processing.

This example is applied to the digital watermark embedding device and the detection device explained by the embodiment, and corresponds to change processing ST9 of the frequency component value and judgment processing ST27 by the frequency component value.

Figure 12:
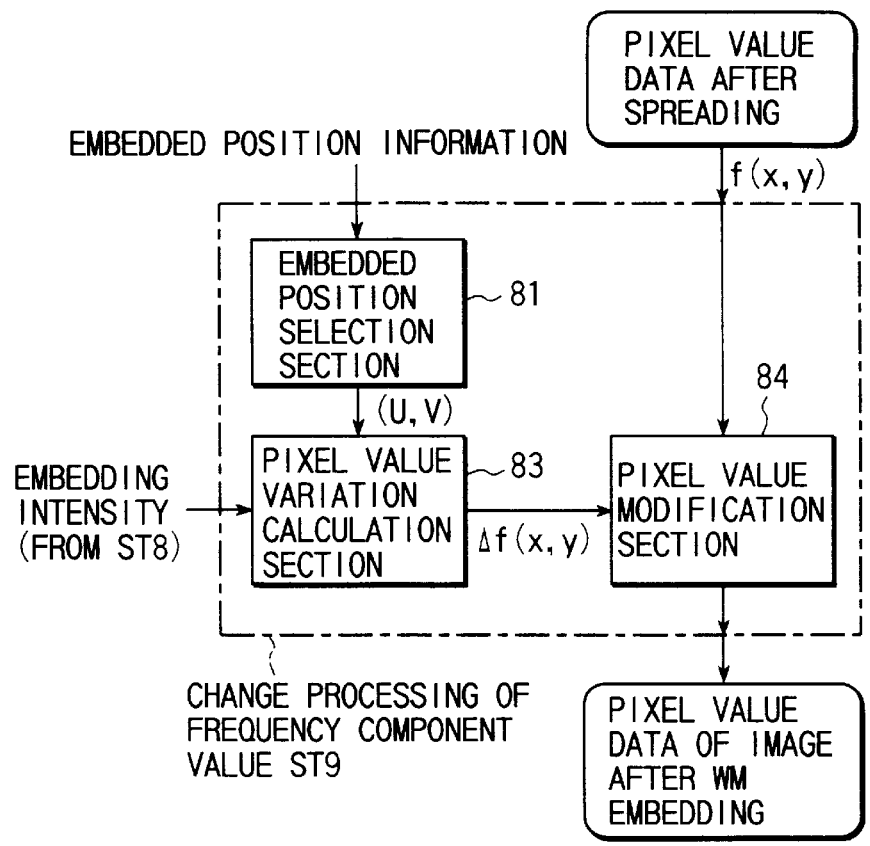
FIG. 12 is a block diagram which shows change processing ST9 of frequency component value of FIG. 10 in an embodiment of the present invention.

FIG. 12 is a block diagram which shows change processing ST9 of the frequency component value of FIG. 10 in the example of the present invention.

In FIG. 12, after inputting the pixel value data of the image which is the embedding target of watermark information and embedding watermark information, change processing ST9 of the frequency component value outputs the pixel value data of the image of the watermarked information. I/O in change processing ST9 of this frequency component value may be inputted and outputted to the entire image and the frame unit in the lump, and may be continuously inputted and outputted in the form of as a bit stream.

Change processing ST9 of the frequency component value has each processing of embedded position selection section 81, pixel value variation calculation section 83, and pixel value modification section 84.

Embedded position selection section 81 decides the position in the frequency domain where watermark information should be embedded without depending on the frequency component value (embedded position). In the following explanation, it is assumed that embedded position (u, v) is one point, and it is also possible to set a plurality of points embedded positions. In that case, embedded position selection section 81 gives set Sf of embedded position (u, v) in the frequency domain.

Embedded position selection section 81 applies the method to which a fixed position in the frequency domain of the image is set as embedded positions, for example, to decide (select) the embedded position of watermark information. Besides this, a fixed position is not set to a embedded position, the following methods are applicable: a method that, though information on the first several frames are fixed, thereafter the embedded position is decided based on information read with the fixed frame, a method in which position calculated from peculiar information to user is set as embedded position, a method in which embedded position is passed by means other than watermark information, a method in which embedded position is generated with random numbers, a method in which sequence of the random numbers is different in each user. Here, a fixed position in the frequency domain of the image and embedding position information corresponding to the embedded position are input from embedding position information storage section 6.

In addition, to avoid the beating between watermark information embedded in two or more positions, the embedded position may be decided in embedded position selection section 81. For example, when the plurality of embedded positions generated with random numbers has a turning value with the same point and the neighborhood point in the pixel value domain, it might be able to be recognized to embed watermark information in the sight. Especially, it is easy to be recognized when overlap of a turning value becomes an area having one dimension or two-dimensional extensions but not one point. Then, the function to judge whether such a beating is occurred between plurality of embedded positions to embedded position selection section 81 is provided, the validity of the candidate is judged by this judgment function every time the candidate in the embedded position is generated, a corresponding candidate is abandoned when judged an improper candidate, and the configuration which selects it as an element of set Sf of the embedded position may be added when judged an appropriate candidate.

Figure 13:
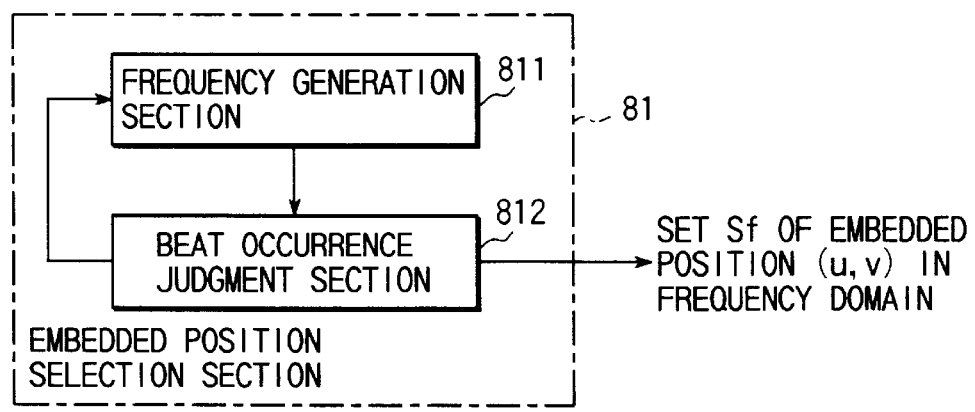
FIG. 13 is a figure which shows an example of processing configuration of embedded position selection section.

The configuration example of such embedded position selection section 81 is shown in FIG. 13. Here, embedded position selection section 81 has frequency generation section 811 which generates the plurality of pairs of the frequency of the watermark decided by random numbers, for example, as a candidate of the embedded position, and beat occurrence judgment section 812 which assumes the candidate in the plurality of generated embedded positions to be an input, judges the level of the beating, and selects and outputs set Sf of embedded positions of a predetermined number (N piece) which avoids the influence of the beating.

Figure 14:
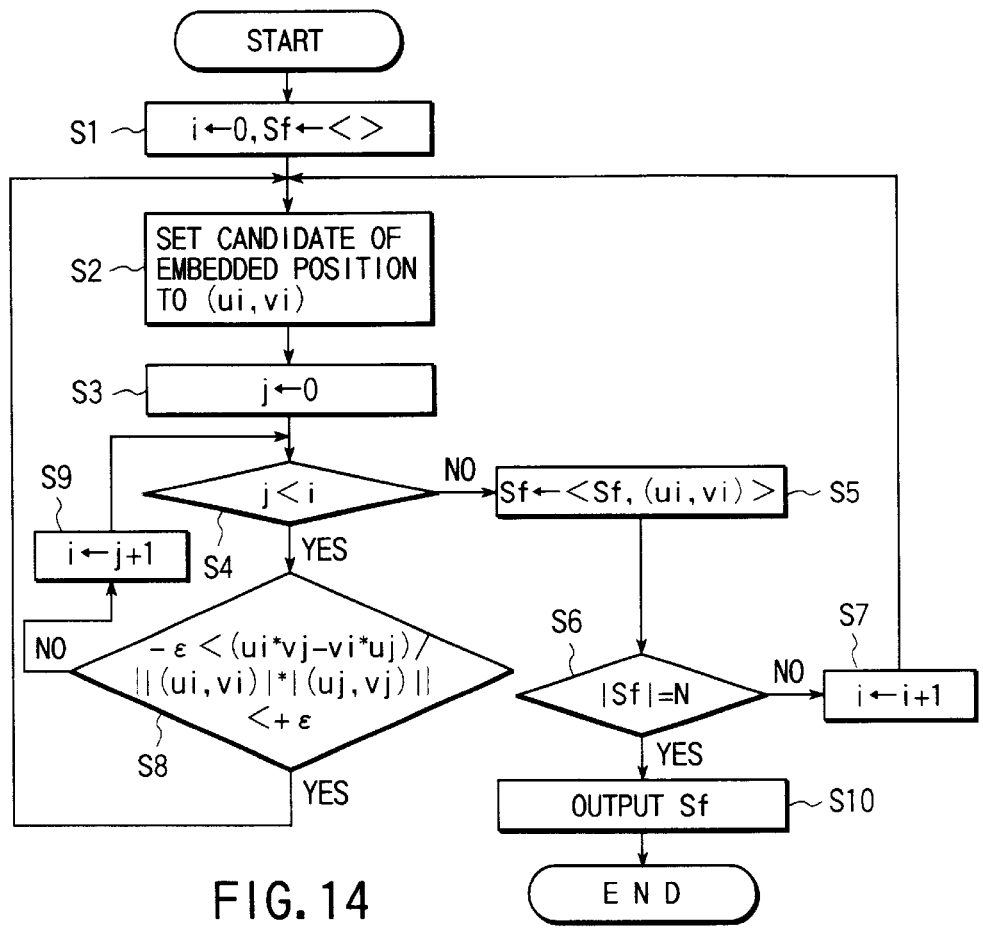
FIG. 14 is a flowchart which shows specific operation at embedded position selection section 81.

Here, specific operation by corresponding embedded position selection section 81 will be explained referring to the flowchart of FIG. 14, when embedded position selection section 81 is constructed as shown in FIG. 13.

First, beat occurrence judgment section 812 sets variable i by which shows the embedded position at initial value 0, and initializes the buffer (list) to store set Sf of embedded position (ui, vi) (step S1). However, (ui, vi)=(0, 0) is not to be set as a candidate.

Under such a condition, one candidate in the embedded position which consists of the pair of the frequency determined by random numbers is generated by frequency generation section 811, and beat occurrence judgment section 812 inputs the embedded position candidate, which is assumed to be (ui, vi), is input (step S2).

Next, beat occurrence judgment section 812 sets variable j, which indicates the embedded position assumed to be a comparison target to evaluate and to judge the level of the beating of embedded position candidate (ui, vi) to initial value 0 (step S3). This variable j shows the embedded position (j-th embedded position of Sf) selected by j-th position.

Next, beat occurrence judgment section 812 compares i and j (step S4), selects embedded position candidate (ui, vi) in that case as a embedded position if not j<i like this example, and is set in j-th position of Sf (step S5).

Here, if the number of embedded position candidates which is set in Sf does not reach N positions, that is, to i=N−1 (step S6), beat occurrence judgment section 812 increments i (step S7). And, the candidate in the following embedded position is generated by frequency generation section 811, and beat occurrence judgment section 812 inputs the embedded position candidate, and assumed to be (ui, vi) (step S2).

Next, beat occurrence judgment section 812 sets j to initial value 0, and if corresponding j is smaller than i, judges whether to exert the influence of the beating on embedded position (ui, vi) where embedded position candidate (ui, vi), that is, (uj, vj) at this time inputted in step S2 is selected by j-th position (step S8). That is, since the wave (watermark) with two or more different frequencies always generates the beating, beat occurrence judgment section 812 performs the judgment of the level of the beating to suppress the area where the beating is generated to a small area and a small dimension as follows.

First, a large beating by which a least common multiple of those frequencies is assumed to be a frequency when the integer ratio is approved between sets of the frequency which consists of the frequency of two or more is generated. For example, when the frequency has the integer ratio in the image with the extension of two dimensions for the watermark of two frequencies, the peak of this beating shows the area of the lattice pattern with the extension of one dimension. Then, the judgment result of the level of the beating is performed by such an integer ratio or judging whether to approve the integer ratio approximately between the plurality of frequencies in beat occurrence judgment section 812.

Specifically, in above-mentioned step S8, beat occurrence judgment section 812 judges the presence of the influence of the beating according to whether the following relationship (ui*vj−vi*uj)/{|(ui, vi)|*|(uj, vj)|} between components of j-th selected embedded position (uj, vj) and embedded position candidate (ui, vi) component (frequency) satisfy the following judgment condition of:

$$\epsilon < (ui^*vj - vi^*uj)/\{|(ui, vi)|^*|(uj, vj)|\} < +\epsilon$$

Here, ϵ is a positive number which becomes 1>> ϵ, and a suitable numerical value is given beforehand. |(u, v)| shows the size of vector (u, v).

That is, since the peak areas of one dimension or two dimensions are generated because of the beating when two frequency components (ui, vi) and (uj, vj) almost have the same direction as a vector, the presence of the influence of the beating judges to exclude the set of the frequency component in such a relation according to the above judgment condition.

When the above-mentioned judgment requirement is satisfied, beat occurrence judgment section 812 judges that a large beating is generated between embedded position candidate (ui, vi) and embedded position (uj, vj), and returns to step S2 without selecting a corresponding candidate. And, frequency generation section 811 creates the candidate in the following embedded position, beat occurrence judgment section 812 inputs the embedded position candidate, which is assumed (ui, vi), and processes of step S3 or thereafter.

In contrast this, when the above-mentioned equation is not satisfied, beat occurrence judgment section 812 judges that a large beating is not generated between embedded position candidate (ui, vi) and embedded position (uj, vj), and increments variable j (step S9). If the value of j after this increment becomes i or more, beat occurrence judgment section 812 judges that it is able to be confirmed that embedded position candidate (ui, vi) at this time does not exert the influence of the beating on all embedded positions (that is, i−1 embedded positions) which have already been selected, selects the embedded position candidate (ui, vi) as a embedded position, and is set in j-th position of Sf (step S5). On the other side, if the value of j after increment is still smaller than that of i, beat occurrence judgment section 812 advances to step S8 judge whether embedded position candidate (ui, vi) at this time exerts the influence of the beating on embedded position (ui, vi) selected by j-th position, that is, (uj, vj).

Then, when the number of embedded positions set in Sf becomes N piece (step S6), beat occurrence judgment section 812 outputs the content of the Sf, that is, the set of the N embedded positions to pixel value variation calculation section 83 (step S10).

Thus, the beating which shows the peak with the extension of one dimension or two dimensions is not generated between each component of the set of the N embedded positions which is outputted from beat occurrence judgment section 812 (in embedded position selection section 81). The procedure according to the flowchart of FIG. 14 is an example, in short, the N embedded position candidates which has no fear of a large beating between the components as a embedded position from among the embedded position candidates sequentially created by frequency generation section 811 may be selected As show in FIG. 12, though the embedding intensity λ is input from processing ST8 of FIG. 10, this means the variation value which expresses embedded watermark information.

When the plurality of embedded position exists, embedding intensity calculation processing ST8 of FIG. 10 is constructed by giving the set λ of the embedding intensity λ corresponding to each point of Sf.

When embedding intensity calculation processing ST8 of FIG. 10 decides ΔF(u, v) the variation value of the frequency component value in embedded position (u, v), frequency component value F(u, v) of position (u, v) becomes F(u, v)+ΔF(u, v) after the embedding watermark information.

Pixel value variation calculation section 83 calculates by inputting variation Δf(x, y) of the pixel value in each point (x, y) in the pixel value domain of the image which becomes the target of the embedding of watermark information and variation ΔF(u, v) of the frequency component value decided by frequency component value variation decision section 82 and calculates embedded position (u, v) in the frequency domain selected by embedded position selection section 81.

Pixel value variation calculation section 83 calculates variation Δf(x, y) of the pixel value according to the next equation (21):

$$\Delta f(x, y) = A^{-1}(x, u) A^{-1}(y, v) \Delta F(u, v) \quad (21)$$

Figure 15:
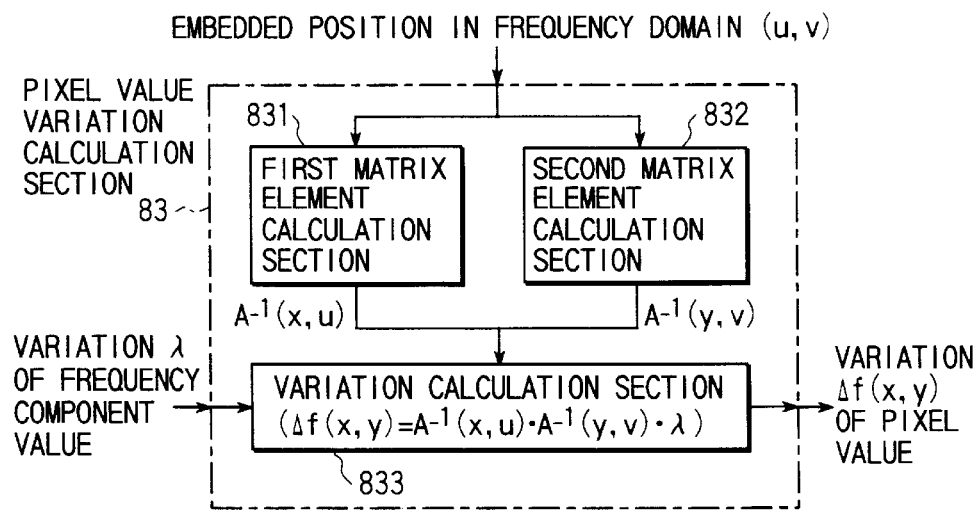
FIG. 15 is a figure which shows an example of processing configuration of pixel value variation calculation section.

The configuration example of pixel value variation calculation section 83 which performs this calculation is shown in FIG. 15.

In the example of FIG. 15, pixel value variation calculation section 83 has the first matrix element calculation section 831, the second matrix element calculation section 832 and variation calculation section 833.

The first matrix element calculation section 831 sequentially inputs embedded position (u, v) in the frequency domain selected by embedded position selection section 81, and calculates the first matrix element $A^{-1}(x,u)$ of the orthogonal transformation. On the other hand, the second matrix element calculation section 832 sequentially inputs embedded position (u, v) in the frequency domain, and, similarly, calculates the second matrix element $A^{-1}(y,v)$ of the orthogonal transformation.

Variation calculation section 833 inputs the calculation result of the first matrix element calculation section 831 and the second matrix element calculation section 832, and variation ΔF(u, v) (=±λ) of the frequency component value decided by frequency component value variation decision section 82, by the performing the calculation according to above-mentioned equation (21), variation calculation section 833 obtains variation Δf(x, y) of the pixel value in each point (x, y) in the pixel value domain corresponding to embedded position (u, v) in the frequency domain. Variation Δf(x, y) of the pixel value in each point (x, y) in the pixel value domain obtained by this variation calculation section 833 is sent to pixel value modification section 84 as an output of pixel value variation calculation section 83.

When the embedded position in the frequency domain selected by embedded position selection section 81 is the plurality of positions, if the embedded position is (ui, vi), the variation of the pixel value in each point (x, y) in the pixel value domain corresponding to the embedded position (ui, vi) is obtained for Each embedded position (ui, vi), the sum total of the variation of each embedded position (ui, vi) in (x, y), that is, $\sigma_i A^{-1}(x,ui) \cdot A^{-1}(y, vi) \cdot \Delta F(ui, vi)$ may be replaced to variation Δf(x, y) of the pixel value.

By the way, when the pixel value takes a discrete value, for example, the integer value, a small variation of the pixel value becomes 0 due to the round-off error for the integer value. Therefore, in pixel value variation calculation section 83, distributed embedded watermark information is not deleted by the influence of this rounding, instead of uniformly rounding down the deviation from the integer value, either of near integer value may be acceptable in probability so that watermark information is reproduced.

When referring to FIG. 12 again, pixel value modification section 84 converts image data according to variation Δf(x, y) of the pixel value of each point (x, y) in the pixel value domain sent from the pixel value variation calculation section 83.

As explained above, in this example, it is possible to achieve the embedding processing of watermark information (to which it is necessary to decide the embedded position of watermark information after orthogonal transformation and to decide the variation of the frequency component value) without the orthogonal transformation and the inversion required in the prior art.

Therefore, by using use digital watermark embedding device 80 according to this embodiment, it becomes possible to embed watermark information sequentially in real time without requiring a large buffer (capacity) even when the input image is given as stream data.

Though, in the above-mentioned explanation, a case that the entire frame of the image is assumed the block and the treatment embedding is performed is described, it is also possible to apply a similar embedding to the block when the frame is divided into the plurality of blocks.

Though the block which becomes the embedding target is explained as an example, two-dimensional block, it is not limited to this. The, for example, in the moving pictures, it is also possible to expand the block into three dimension by assuming the embedding area further including time direction.

As a result, even when watermark information cannot be distributed and embedded by distributing enough in a small block, it is possible that watermark information is distributed enough and embedded by obtaining an enough pixel point by extending to the plurality of frame. It is also possible to embed watermark information in a strong form against thinning out the frame.

When the block is expanded into three dimensions, if the frequency conversion is performed after the pixel value data of the block over the time direction is temporarily stored in a large buffer, there is a fear that disadvantages of occurrence of a time delay and becoming very heavy processing by the processing. However, in this example, since the embedding can sequentially be performed to the input stream data, watermark information be embedded at high speed without requiring a large buffer.

In that case, to avoid the block boundary being recognized in the sight, the variation of the pixel value by the embedding of watermark information may be faded-out around the area in the block. Since watermark information is distributed and is embedded over the entire block, it is possible to detect correctly by the fade-out of the circumference section of the block.

The block in the three-dimensional image may have an offset so that the cut of each frame is arranged at the different position. The offset may be set at random. In addition, if suitable orthogonal transformation can be defined, the shape of the block need not be a hexahedron. It is not necessary to embed in shape that it is restrained in one frame when the block is two-dimensional block, and may be embedded freely in the three-dimensional image.

Figure 16:
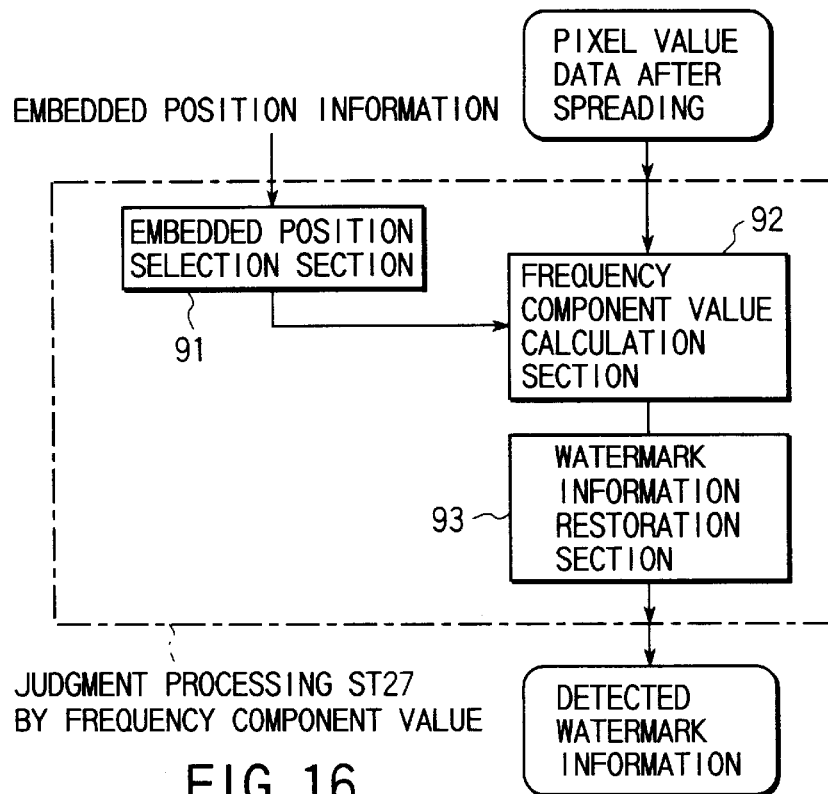
FIG. 16 is a block diagram which shows judgment processing ST27 in example of the present invention by frequency component value of FIG. 11.

FIG. 16 is a block diagram which shows judgment processing ST27 in the example of the present invention by the frequency component value of FIG. 11.

Judgment processing ST27 by the frequency component value has embedded position selection section 91, frequency component value calculation section 92, and watermark information restoration section 93.

Embedded position selection section 91 has the function same as embedded position selection section 81 in change processing ST9 of the frequency component value of FIG. 12, and selects the same position (u, v) as embedded position (u, v) in the frequency domain selected at the embedding by corresponding embedded position selection section 81. Information of selected embedded position (u, v) is passed to frequency component value calculation section 92.

Frequency component value calculation section 92 calculates frequency component value F(u, v) of position (u, v) in the frequency domain selected by embedded position selection section 91 according to the next equation (22):

$$F(u, v) = \sigma x \sigma y A(u, x) A(v, y) f(x, y) \quad (22)$$

Here, A(u, x) and A(v, y) are the matrix elements of the orthogonal transformation.

Figure 17:
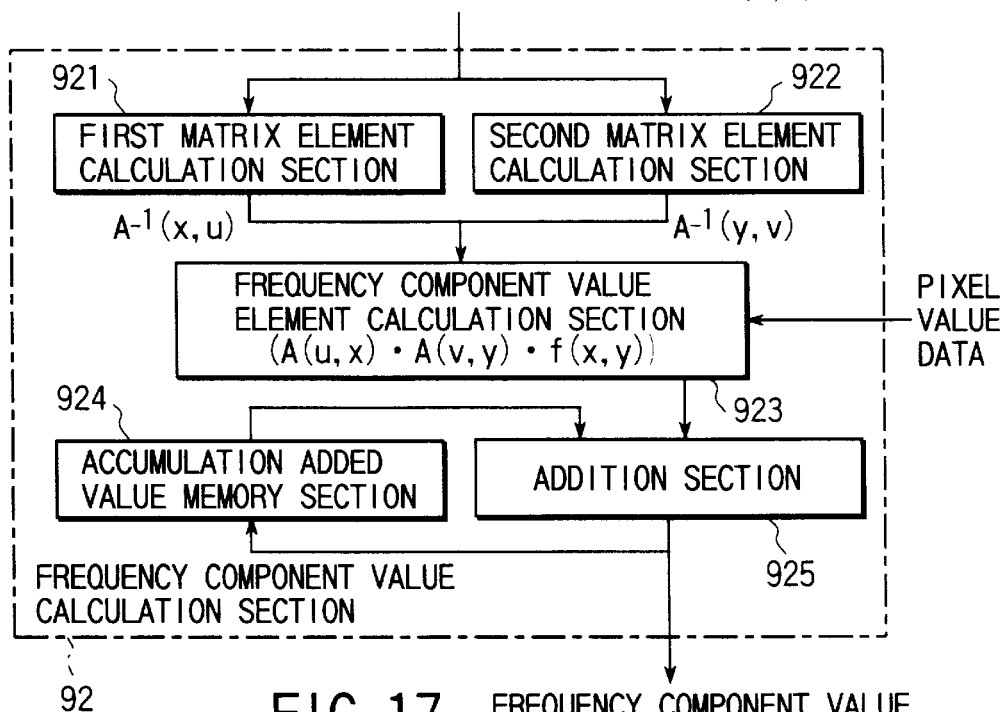
FIG. 17 is a figure which shows an example of processing configuration of frequency component value calculation section.

The configuration example of frequency component value calculation section 92 which performs this calculation is shown in FIG. 17.

In the example of FIG. 17, frequency component value calculation section 92 has matrix element calculation section 922 matrix element calculation section 921 of first and 2, frequency component value element calculation section 923, accumulation added value memory section 924, and addition section 925.

The first matrix element calculation section 921 sequentially inputs embedded position (u, v) in the frequency domain selected by embedded position selection section 91, and calculates the first matrix element A(u, x) of the orthogonal transformation. On the other hand, the second matrix element calculation section 922 sequentially inputs embedded position (u, v) in the frequency domain, and, similarly, calculates the second matrix element A(v, y) of the orthogonal transformation.

Frequency component value element calculation section 923 inputs the calculation result of the first matrix element calculation section 921 and the second matrix element calculation section 922, sequentially inputs Pixel value f(x, y) of each point (x, y) in the pixel value domain corresponding to embedded position (u, v) in the frequency domain, and calculates A(u, x)·A(v, y)·f(x, y), that is, the element of the frequency component value in every case. Frequency component value element calculation section 923 inputs the calculation result of the first matrix element calculation section 921 and the second matrix element calculation section 922, sequentially inputs pixel value f(x, y) of each point (x, y) in the pixel value domain corresponding to embedded position (u, v) in the frequency domain, and Calculates A(u, x)·A(v, y)·f(x, y), that is, the element of the frequency component value in every case.

Accumulation added value memory section 924 is used to memorize the sum (accumulation value) of A(u, x)·A(v, y)·f(x, y) calculated now by frequency component value element calculation section 923.

Addition section 925 adds the calculation result and the content of accumulation added value memory section 924 at that time whenever A(u, x)·A(v, y)·f(x, y) are calculated by frequency component value element calculation section 923, and obtains the sum of A(u, x)·A(v, y)·f(x, y) calculated by frequency component value element calculation section 923 by that time (accumulation value). The content of accumulation added value memory section 924 is updated to the calculation result of this addition section 925.

Thus, The input of pixel value f(x, y) of all pixels in the block which is the embedding target is finished, A(u, x)·A(v, y)·f(x, y) of the last f(x, y) are calculated by frequency component value element calculation section 923, and when the calculation result and the content of accumulation added value memory section 924 (an initial value is 0) are added by addition section 925. The addition result σxσyA(u, x)·A(v, y)·f(x, y) are output from the frequency component value calculation section 92 to watermark information restoration section 93 as frequency component value F(u, v) of embedded position (u, v) selected by embedded position selection section 91.

Watermark information restoration section 93 restores embedded watermark information by F(u, v) output from the frequency component value calculation section 92. It is possible to achieve it by presuming that 1 is embedded if F(u, v)>0, and o is embedded if F(u, v)<0.

As mentioned above, change processing ST9 of the frequency component value and judgment processing ST27 by the frequency component value shown in FIG. 10 and FIG. 11 are executed as an example.

SECOND EXAMPLE

The second example, which is applied to digital watermark embedding device and the detection device explained by embodiment, corresponding to step ST6, step ST9, and step ST10 of FIG. 10 will be explained. This example is similar to the first example of excluding the point explained as follows.

According to this example, a more efficient embedding becomes possible since processing of multiplication of the PN sequence to the image can be omitted.

Figure 18:
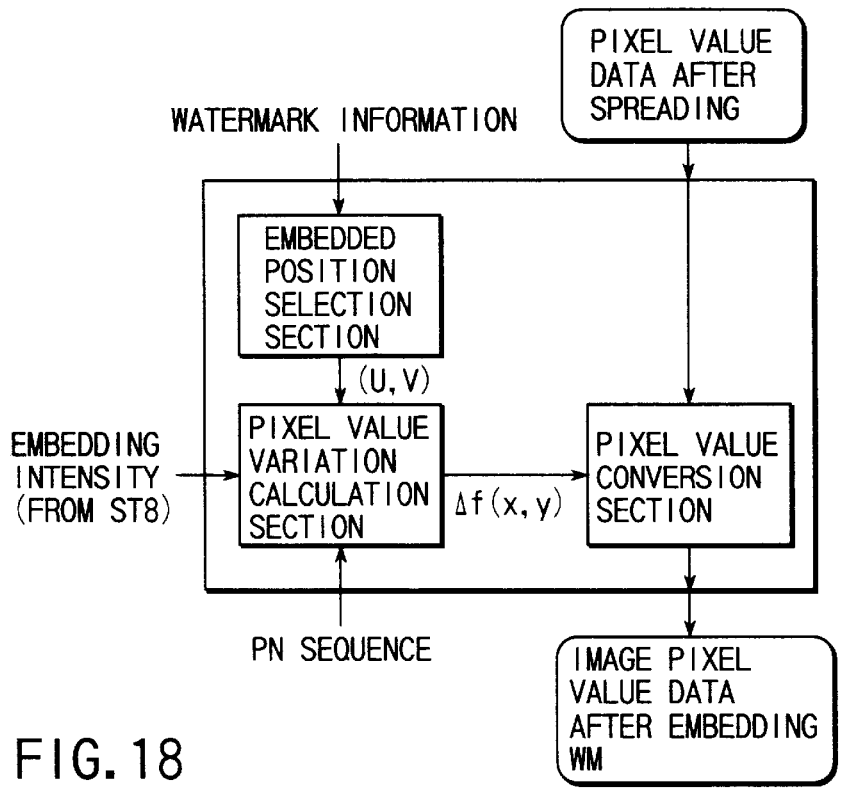
FIG. 18 is a figure which shows an configuration example of the processing section which achieves an Multiplication of PN sequence processing, and a change processing of the frequency component and a Multiplication of PN sequence processing.
Figure 19:
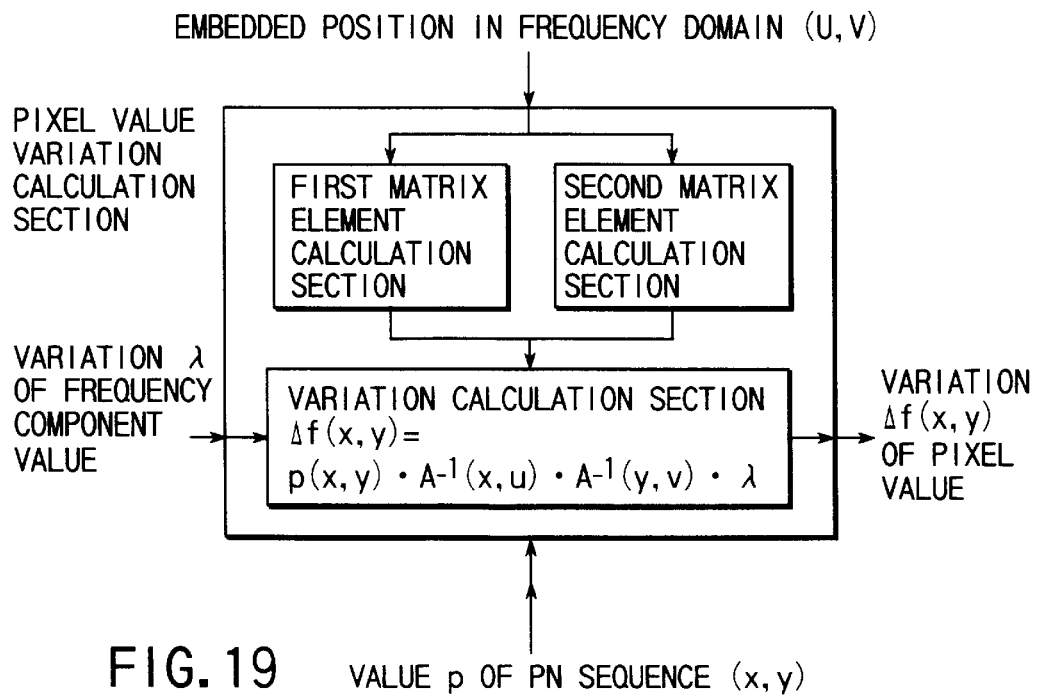
FIG. 19 is a figure which shows an example of configuration of pixel value variation calculation section.

FIG. 18 is an example to achieve processing section having three processings of multiplication of PN sequence processing ST6 in FIG. 10, change processing ST9 of the frequency component, and Multiplication of PN sequence processing ST10.

The difference point with the first example is a point that the image which does not multiply the PN sequence is inputted, the variation of the pixel value is calculated directly without creating the image to which the PN sequence is multiplied, and the output image is outputted in the processing section of this example.

The reason why such an example can be achieved is as follows.

In the first example, in stead of the arithmetic of the equation (21) which change processing ST9 of the frequency component calculated, in this example, by calculating:

$$A^{-1}(x,u) \cdot A^{-1}(y, v) \cdot \Delta f(x, y) = p(x, y) \cdot \Delta F(u, v)$$

Multiplication product processing of PN sequence therebefore and thereafter can be omitted.

The pixel value variation calculation section in FIG. 3A to FIG. 3D is same as the first example, if the point to input the PN sequence and the point to calculate the variation according to the new equation described on are excluded. FIG. 5 is an configuration example of the pixel value variation calculation section.

As mentioned above, three processing of multiplication of PN sequence processing ST6, change processing ST9 of the frequency component, and Multiplication of PN sequence processing ST10 shown in FIG. 10 matches are executed.

The present invention is not limited to the abovementioned each embodiment and example. It is possible to transform variously within the scope of the invention.

In the embodiment and the example, though the image information is chiefly explained as a digital watermark embedding target, the digital watermark embedding target which can be applied to the present invention is not limited to this, and various digital data such as the text data, CAD data, and the music data, etc. can be applied. The pixel is considered as a basic unit in the embodiment, and the spreading block is assumed to be a configuration having two or more pixels, for example. In the digital music data etc., to a basic unit corresponding to the pixel, the data unit which has two or more basic units corresponds to the spreading block in this case. It is similar to the averaging block.

As a specific application case, besides a case that information in which digital watermark is embedded by present invention in storage medium such as DVD is stored, the digital information distribution system which transmits watermark embedding information on the network of Internet etc. can be considered. The present invention can be applied also to SDMI etc. for the music distribution on Internet.

In addition, in the embodiment and the example, though the case where the present invention is achieved on IC chip is explained, the present invention includes the case where the present invention is constructed to various processing chips such as chips for the chip for MPEG and DVD as a part.

In the embodiment and the example, though the case to perform the watermark information embedding and the detection/extraction without performing the orthogonal transformation of the entire image data is explained, the orthogonal transform of the entire image data is performed, watermark information is embedded, and an inverse-orthogonal transformation may be performed.

The computer reads the program stored in the storage medium and the device explained in the embodiment and the example can be achieved.

Here, any memory method can be applied to the present invention, a memory device on which the program can be memorized and to which the computer is a readable, such as magnetic disk, floppy disk, hard drive, optical disk (CD-ROM, CD-R, and DVD, etc.), magnet-optical disks (MO etc.), and semiconductor memories, etc. may be applied as a storage medium.

A part of each processing for OS (operating system) and MW (middleware) etc. of the database management software and the network software, etc. which operates on the computer is executed to achieve this embodiment based on the instruction of the program installed from the storage medium to the computer.

In addition, the storage medium in the present invention is not limited to a medium independent of the computer, and may include the storage medium which down-loads and memorizes or temporarily memorizes the program transmitted by LAN and Internet, etc.

The storage medium is not limited to one, when processing in this embodiment is executed from the plurality of media, the storage medium in the present invention also includes these media and the configuration of the medium can be any configurations.

The computer in the present invention executes each processing in this embodiment based on the program memorized to the storage medium, and may be any configuration such as a device consisting of one of personal computers and system to which the plurality of device are connected with the network.

The computer in the present invention is not limited to the personal computer, and also includes the arithmetic processing device included in the information processing equipment and the microcomputer, etc., and generically calls the equipment and the device which can achieve the function of the present invention by the program.

In addition, the present invention is applied to the record medium storing the digital data in which watermark information is embedded in the procedure same as embedding digital watermark information with the digital watermark embedding device of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding device by which digital data is assumed to be an embedding target and the digital watermark is embedded, comprising:

average value calculation means to set said embedding target to be a unit averaging block which calculates an average of the averaging block In which said embedding target includes more than two adjacent basic units of each base which constructs the plurality of basic units, and calculate an average of the plurality of basic units at every said averaging block;

data shift means to shift basic value of each said plurality basic units which belong to said averaging block by calculating a difference of each averaging block with the average value of basic value of each said plurality basic units which belong to the averaging block and the corresponding averaging block;

spread spectrum means to perform a spread spectrum of the embedding target to which the value is shifted by said data shift means; and watermark embedding means to embed a digital watermark in the embedding target to which the spread spectrum Is performed by said spread spectrum means.

2. The digital watermark embedding device according to claim 1 or claim 1, further comprising embedding intensity calculation means, when said embedding target is assumed to be sets of values of basic unit which constructs the embedding target, to assume a square-mean of the values of the basic unit as a square-mean of the frequency component value in the frequency domain after the spreading of said sets and to calculate the embedding intensity of the digital watermark based on the square-mean of said frequency component value, wherein said watermark embedding means embeds the digital watermark in said embedding target by using said embedding intensity.

3. The digital watermark embedding device according to claim 1 or claim 1, wherein said digital data is image data, and said basic unit is a pixel which constructs the image.

4. A digital information distribution device comprising:

means to input digital data in which the digital watermark is embedded by the digital watermark embedding device according to claim 1; and means to distribute said digital data.

5. A computer readable storage medium on which data having a structure in which a digital watermark is embedded by the digital watermark embedding device of claim 2 or claim 1 is recorded.

6. A digital watermark embedding device by which digital data is assumed to be an embedding target and the digital watermark is embedded, comprising:

average value calculation means to set said embedding target to be a unit averaging block which calculates an average of the averaging block in which said embedding target includes more than two adjacent basic units of each base which constructs the plurality of basic units, and calculate an average of the plurality of basic units at every said averaging block;

data shift means to shift basic value of each said plurality basic units which belong to said averaging block by calculating a difference of each averaging block with the average value of basic value of each said plurality basic units which belong to the averaging block and the corresponding averaging block;

spread spectrum means to set said embedding target to be a unit spreading block which performs the spread spectrum of the spreading block in which said embedding target includes more than two adjacent basic unit of each bases which constructs the plurality of basic units, multiplies the same pseudo-random number signal is multiplied to said embedding target more than two said basic units in said unit spreading block, and perform the spread spectrum of said embedding target; and watermark embedding means to embed the digital watermark in the embedding target to which the spread spectrum is performed by said spread spectrum means.

7. The digital watermark embedding device according to claim 6, wherein said spreading block is smaller data size than that of said averaging block, and is included in said averaging block.

8. A digital watermark detection device which detects the digital watermark from the digital watermark detection target which consists of digital data comprising:
average value calculation means to set said detection target to be a unit averaging block which calculates an average of the averaging block in which said detection target includes more than two adjacent basic units of each base which constructs the plurality of basic units, and calculate an average of the plurality of basic units at every said averaging block;
data shift means to shift basic value of each said plurality basic units which belong to said averaging block by calculating a difference of each averaging block with the average value of basic value of each said plurality basic units which belong to the averaging block and the corresponding averaging block;
spread spectrum means to perform a spread spectrum of the detection target to which the value is shifted by said data shift means; and
watermark detection means to detect the digital watermark from the detection target to which the spread spectrum is performed by said spread spectrum means.

9. The digital watermark detection device according to claim 8 or claim 11, wherein said digital data is assumed to be image data, and said basic unit a pixel which constructs an image.

10. The digital information distribution device comprising:
means to input the digital data which distributes or is distributed; and
a digital watermark detection device according to claim 8 or claim 11 which detects the digital watermark from said digital data.

11. A digital watermark detection device which detects the digital watermark from the digital watermark detection target which consists of digital data comprising:
average value calculation means to set said detection target to be a unit averaging block which calculates an average of the averaging block in which said detection target includes more than two adjacent basic units of each base which constructs the plurality of basic units, and calculate an average of the plurality of basic units at every said averaging block;
data shift means to shift basic value of each said plurality basic units which belong to said averaging block by calculating a difference of each averaging block with the average value of basic value of each said plurality basic units which belong to the averaging block and the corresponding averaging block;
spread spectrum means to set a spreading block which includes said detection target of more than two adjacent basic units among basic units which construct said detection target to be a unit in which the spread spectrum is performed, and to perform the spread spectrum of said detection target by multiplying a same pseudo-random number signal to a basic unit in a same spreading block; and
watermark detection means to detect the digital watermark from the detection target to which the spread spectrum is performed by said spread spectrum means.

12. The digital watermark detection device according to claim 11, wherein said spreading block is smaller data size than that of said averaging block, and is included in said averaging block.

13. In a computer readable storage medium which memorizes a program which controls the digital watermark embedding device which embeds the digital watermark, in which digital data is assumed to be an embedding target, said program comprising:
average value calculation means to set said detection target to be a unit averaging block which calculates an average of the averaging block in which said detection target includes more than two adjacent basic units of each base which constructs the plurality of basic units, and calculate an average of the plurality of basic units at every said averaging block;
data shift means to shift basic value of each said plurality basic units which belong to said averaging block by calculating a difference of each averaging block with the average value of basic value of each said plurality basic units which belong to the averaging block and the corresponding averaging block;
spread spectrum means to perform a spread spectrum of the detection target to which the value is shifted by said data shift means; and
watermark embedding means to embed the digital watermark in the embedding target to which the spread spectrum is performed by said spread spectrum means.

14. The storage medium according to claim 13, further comprising embedding intensity calculation means, when said embedding target is assumed to be sets of values of basic unit which constructs the embedding target, to assume a square-mean of the values of the basic unit as a square-mean of the frequency component value in the frequency domain after the spreading of said sets and to calculate the embedding intensity of the digital watermark based on the square-mean of said frequency component value, wherein
said watermark embedding means embeds the digital watermark in said embedding target by using said embedding intensity.

15. In a computer readable storage medium which memorizes a program which controls the digital watermark detection device which embeds the digital watermark, in which digital data Is assumed to be a detection target, said program comprising:
average value calculation means to set said detection target to be a unit averaging block which calculates an average of the averaging block in which said detection target includes more than two adjacent basic units of each base which constructs the plurality of basic units, and calculate an average of the plurality of basic units at every said averaging block;
data shift means to shift basic value of each said plurality basic units which belong to said averaging block by calculating a difference of each averaging block with the average value of basic value of each said plurality basic units which belong to the averaging block and the corresponding averaging block;
spread spectrum means to perform a spread spectrum of the detection target to which the value is shifted by said data shift means; and
watermark detection means to detect the digital watermark from the detection target to which the spread spectrum is performed by said spread spectrum means.

16. A manufacturing method of a computer readable record medium in which digital data is assumed to be an embedding target and the digital watermark is embedded comprising:

setting said embedding target to be a unit averaging block which calculates an average of the averaging block in which said embedding target includes more than two adjacent basic units of each base which constructs the plurality of basic units, and calculating an average of the plurality of basic units at every said averaging block;

shifting basic value of each said plurality basic units which belong to said averaging block by calculating a difference of each averaging block with the average value of basic value of each said plurality basic units which belong to the averaging block and the corresponding averaging block;

performing a spread spectrum of the embedding target to which the value is shifted by said data shift means;

embedding a digital watermark in the embedding target to which the spread spectrum is performed; and recording said embedding target to which the digital watermark is embedded.

17. A manufacturing method of a computer readable record medium in which digital data is assumed to be an embedding target and the digital watermark is embedded comprising:

setting said embedding target to be a unit averaging block which calculates an average of the averaging block in which said embedding target includes more than two adjacent basic units of each base which constructs the plurality of basic units, and calculating an average of the plurality of basic units at every said averaging block;

shifting basic value of each said plurality basic units which belong to said averaging block by calculating a difference of each averaging block with the average value of basic value of each said plurality basic units which belong to the averaging block and the corresponding averaging block;

setting said embedding target to be a unit spreading block which performs the spread spectrum of the spreading block in which said embedding target includes more than two adjacent basic unit of each bases which constructs the plurality of basic units, multiplying the same pseudo-random number signal is multiplied to said embedding target more than two said basic units in said unit spreading block, and performing the spread spectrum of said embedding target;

embedding the digital watermark in the embedding target to which the spread spectrum is performed by said spread spectrum means; and recording said embedding target to which the digital watermark is embedded.

* * * * *

UNITED STATES PATENT AND TRADEMARK OFFICE
CERTIFICATE OF CORRECTION

PATENT NO. : 6,768,807 B1  Page 1 of 1
DATED : July 27, 2004
INVENTOR(S) : Muratani It is certified that error appears in the above-identified patent and that said Letters Patent is hereby corrected as shown below:

Title page,
Item [54], Title, change "AND, STORAGE MEDIUM" to -- AND STORAGE MEDIUM --

Column 28,
Line 1, change "In" to -- in --.
Lines 18 and 31, change "claim 1 or claim 1" to -- claim 1 or claim 6 --.
Line 36, change "claim 1" to -- claim 1, claim 6 or claim 7 --.
Lines 40-41, change "claim 2 or claim 1" to -- claim 1 or claim 6 --.

Signed and Sealed this

Sixteenth Day of November, 2004

JON W. DUDAS
*Director of the United States Patent and Trademark Office*